(12) United States Patent
Woodbury et al.

(10) Patent No.: US 12,391,263 B2
(45) Date of Patent: Aug. 19, 2025

(54) VEHICLE DIAGNOSTIC INFORMATION COMMUNICATIONS

(71) Applicant: Rivian IP Holdings, LLC, Plymouth, MI (US)

(72) Inventors: Ammy Lynn Woodbury, Santa Clara, CA (US); Feyijimi Adegbohun, San Jose, CA (US); Tyree Worthy, South San Francisco, CA (US); Christie Rhea Fremon, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 249 days.

(21) Appl. No.: 17/845,875

(22) Filed: Jun. 21, 2022

(65) Prior Publication Data

US 2023/0406330 A1  Dec. 21, 2023

(51) Int. Cl.
*B60W 50/02* (2012.01)
*B60W 50/04* (2006.01)
*B60W 50/14* (2020.01)

(52) U.S. Cl.
CPC ...... *B60W 50/0205* (2013.01); *B60W 50/045* (2013.01); *B60W 50/14* (2013.01); *B60W 2050/146* (2013.01); *B60W 2520/04* (2013.01); *B60W 2540/21* (2020.02); *B60W 2540/215* (2020.02); *B60W 2556/45* (2020.02)

(58) Field of Classification Search
CPC ........... B60W 50/0205; B60W 50/045; B60W 50/14; B60W 2050/146; B60W 2520/04; B60W 2540/21; B60W 2540/215; B60W 2556/45; B60W 2420/54
See application file for complete search history.

(56) References Cited

U.S. PATENT DOCUMENTS

| | | | | |
|---|---|---|---|---|
| 6,070,113 A | * | 5/2000 | White | B60R 21/013 180/282 |
| 6,204,756 B1 | * | 3/2001 | Senyk | B60R 21/0136 340/436 |

(Continued)

FOREIGN PATENT DOCUMENTS

| | | | | |
|---|---|---|---|---|
| CN | 111063054 A | * | 4/2020 | |
| KR | 20140074536 A | * | 6/2014 | ............. B60R 16/02 |
| KR | 20170018699 A | * | 2/2017 | ............. B60K 35/00 |

OTHER PUBLICATIONS

Translation of KR 20140074536 A retrieved from Espacenet on Apr. 2, 2024 (Year: 2024).*

(Continued)

*Primary Examiner* — Fadey S. Jabr
*Assistant Examiner* — Faris Asim Shaikh
(74) *Attorney, Agent, or Firm* — BAKER HOSTETLER

(57) ABSTRACT

Systems and methods for determining vehicle diagnostic information are disclosed. In some embodiments, the method comprises collecting first data associated with a vehicle at a first frequency and second data associated with the vehicle at a second frequency higher than the first frequency. A size of the second data is greater than a size of the first data. The method further comprises determining whether a vehicle event associated with the vehicle is occurring. In accordance with a determination of an occurrence of the vehicle event, a portion of the second data is identified. Based on the portion of the second data, the vehicle diagnostic information is determined.

21 Claims, 9 Drawing Sheets

(56) References Cited

U.S. PATENT DOCUMENTS

| | | | | |
|---|---|---|---|---|
| 7,747,365 B1* | 6/2010 | Lowrey | G07C 5/008 | 701/31.4 |
| 10,773,704 B1* | 9/2020 | Rollinger | B60W 10/06 | |
| 10,909,782 B1* | 2/2021 | Natanzon | G07C 5/0841 | |
| 11,823,257 B2* | 11/2023 | Harvey | G06Q 30/0207 | |
| 11,928,739 B2* | 3/2024 | Salodkar | G06N 20/20 | |
| 2006/0069963 A1* | 3/2006 | Miglianico | G06F 11/2221 | 714/E11.163 |
| 2008/0177438 A1* | 7/2008 | Chen | G07C 5/0808 | 701/31.4 |
| 2009/0319119 A1* | 12/2009 | Park | G07C 5/085 | 701/31.4 |
| 2010/0070107 A1* | 3/2010 | Berkobin | G07C 5/008 | 701/1 |
| 2011/0130906 A1* | 6/2011 | Mayer | G07C 5/085 | 903/903 |
| 2011/0130916 A1* | 6/2011 | Mayer | B60L 3/0023 | 903/903 |
| 2012/0041635 A1* | 2/2012 | Johnson | G06F 11/2294 | 701/31.4 |
| 2012/0257573 A1* | 10/2012 | Moeller | H04L 67/06 | 370/328 |
| 2014/0176347 A1* | 6/2014 | Kim | G08G 1/096791 | 340/907 |
| 2015/0213706 A1* | 7/2015 | Bai | G08B 21/185 | 340/635 |
| 2016/0071332 A1* | 3/2016 | MacFarlane | F16H 61/16 | 701/29.1 |
| 2016/0140781 A1* | 5/2016 | Lang | B60R 21/0136 | 701/33.7 |
| 2017/0069144 A1* | 3/2017 | Lawrie-Fussey | G07C 5/085 | |
| 2017/0084173 A1* | 3/2017 | Kim | G08G 1/07 | |
| 2017/0134537 A1* | 5/2017 | O'Mahony | H04L 69/18 | |
| 2019/0016342 A1* | 1/2019 | Fredman | G08G 1/16 | |
| 2019/0168730 A1* | 6/2019 | Park | B60T 7/22 | |
| 2019/0206151 A1* | 7/2019 | Zucconelli | G07C 5/085 | |
| 2020/0023887 A1* | 1/2020 | Sasaki | B62D 5/0493 | |
| 2020/0028736 A1* | 1/2020 | Park | H04W 4/44 | |
| 2020/0041994 A1* | 2/2020 | Alalao | G05D 1/0022 | |
| 2020/0092682 A1* | 3/2020 | Winograd | G01S 19/34 | |
| 2020/0118358 A1* | 4/2020 | Lee | G06N 20/00 | |
| 2021/0027555 A1* | 1/2021 | Bellas | G07C 5/085 | |
| 2021/0319332 A1* | 10/2021 | Isaac | G07C 5/085 | |
| 2021/0347371 A1* | 11/2021 | Lee | B60W 50/14 | |
| 2022/0012538 A1* | 1/2022 | Mizoguchi | G06N 3/08 | |
| 2023/0029704 A1* | 2/2023 | Subramanian | B60T 8/885 | |
| 2023/0131471 A1* | 4/2023 | Sobecki | G06V 40/20 | 348/148 |
| 2023/0159033 A1* | 5/2023 | Dill | G05B 17/02 | 701/28 |
| 2023/0245239 A1* | 8/2023 | Collins | G06F 18/2113 | 705/4 |

OTHER PUBLICATIONS

Translation of KR 20170018699 A retrieved from Espacenet on Apr. 2, 2024 (Year: 2024).*

Translation of CN-111063054-A retrieved from Espacenet on Apr. 3, 2024 (Year: 2024).*

* cited by examiner

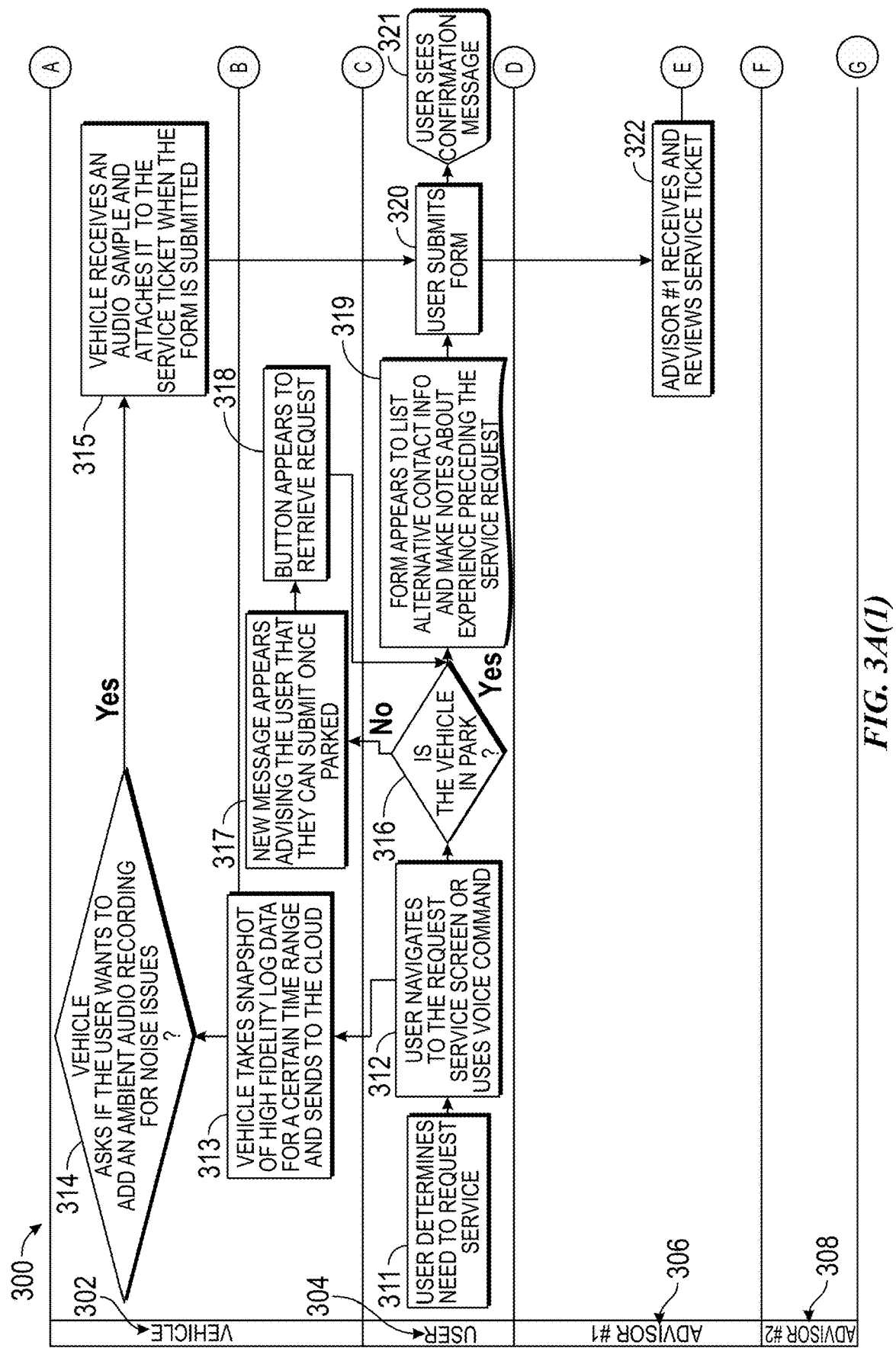
FIG. 3A(1)

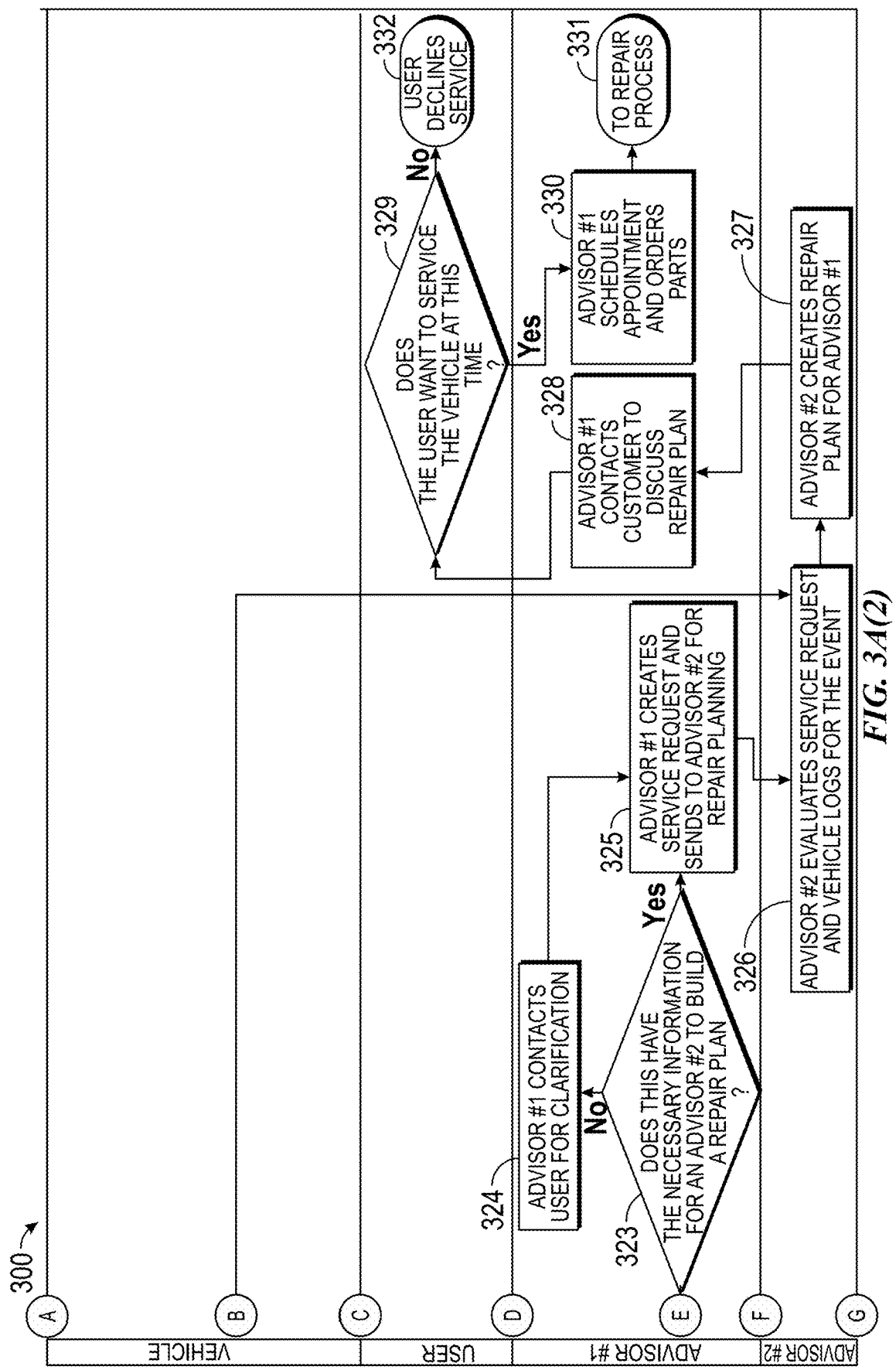
FIG. 3A(2)

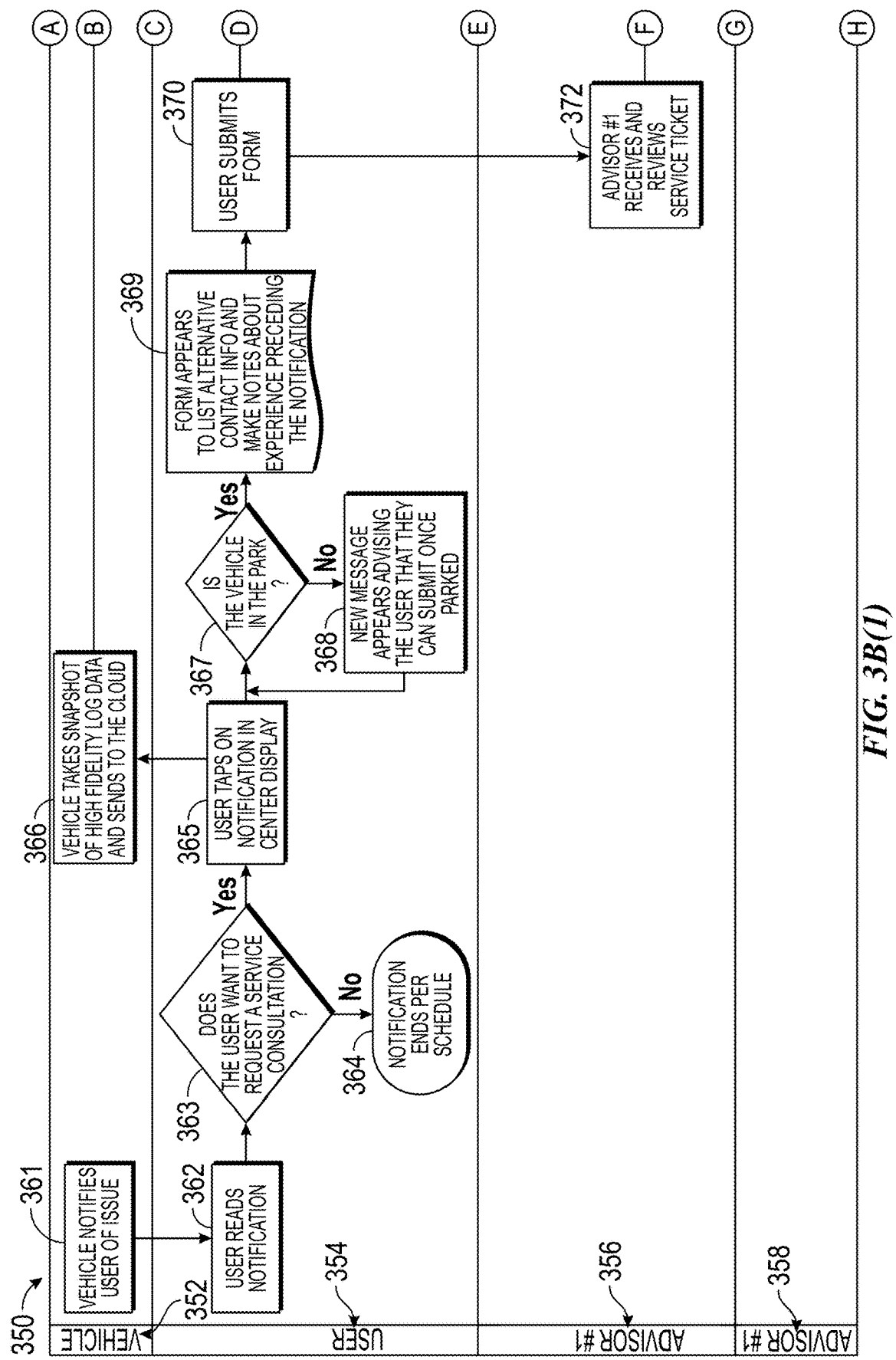
FIG. 3B(1)

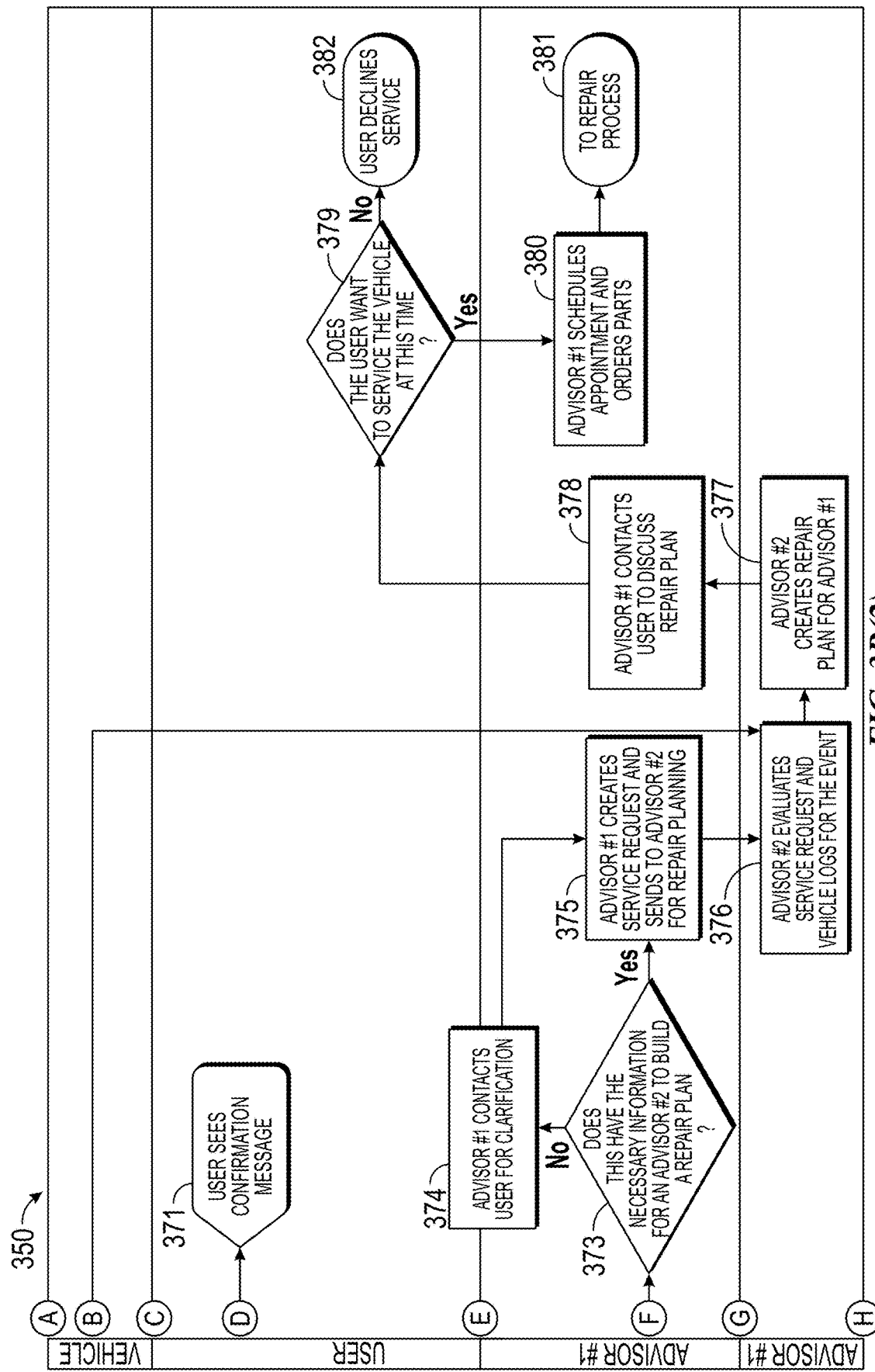
FIG. 3B(2)

VEHICLE DIAGNOSTIC INFORMATION COMMUNICATIONS

INTRODUCTION

It may be unreliable and/or inefficient to communicate vehicle diagnostic information past a certain time after a vehicle event. For example, a vehicle experiences an operational issue. At a later time (for example, at the service center), it may be difficult for the vehicle owner to accurately describe the issue, and it may be difficult to reproduce the issue. Data from the vehicle may be gathered to determine the underlying problem, but because the problem may not be pinpointed, a large amount of data may be gathered and analyzed, which may be costly and time consuming. Therefore, it may be difficult to diagnose vehicle issues efficiently.

BRIEF SUMMARY

Systems and methods for determining vehicle diagnostic information are disclosed. In some embodiments, the method comprises collecting first data (e.g., low fidelity ("lo-fi") data) associated with a vehicle at a first frequency and second data (e.g., high fidelity ("hi-fi") data) associated with the vehicle at a second frequency higher than the first frequency. A size of the second data is greater than a size of the first data. The method further comprises determining whether a vehicle event associated with the vehicle is occurring. In accordance with a determination of an occurrence of the vehicle event, a portion of the second data is identified. Based on the portion of the second data, the vehicle diagnostic information is determined.

The embodiments disclosed above are examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A(1), 3A(2), 3B(1), and 3B(2) illustrates an example of vehicle diagnostic information communication.

DESCRIPTION OF EXAMPLE EMBODIMENTS

Figure 1:
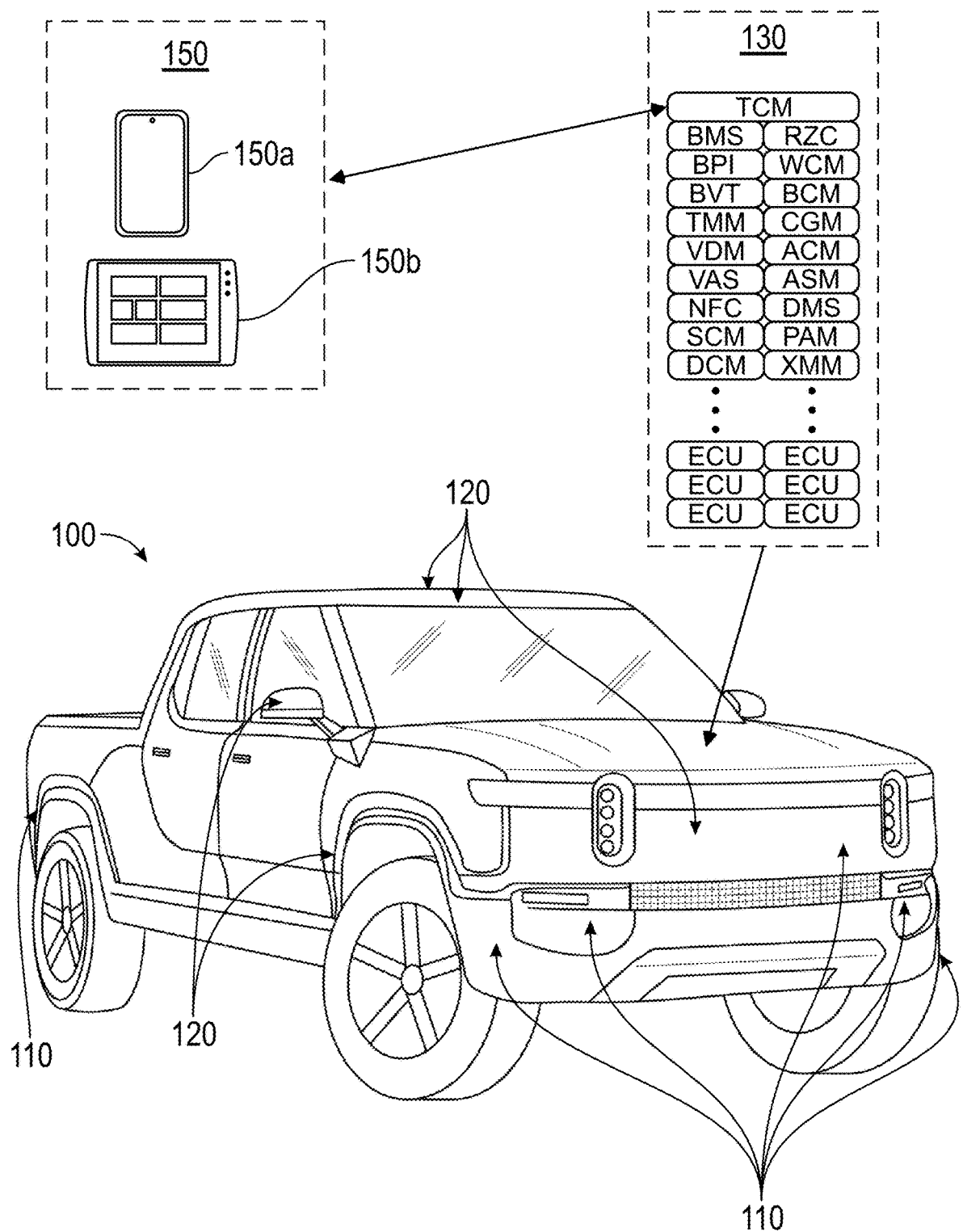
FIG. 1 illustrates an example vehicle.

Systems and methods for communicating vehicle diagnostic information are disclosed. In some embodiments, the method comprises collecting first data associated with a vehicle at a first frequency and second data associated with the vehicle at a second frequency higher than the first frequency.

For example, the first data comprise low fidelity ("lo-fi") data, and the second data comprise high fidelity ("hi-fi") data. Hi-fi data comprise data log collected from an electrical control unit (ECU) of the vehicle. Example ECUs are described in more detail below. Examples of hi-fi data include addresses, data packets transmitted and received by an ECU, communications between ECUs, currents and/or voltages of individual cells of one or more batteries, of modules of one or more batteries, and at battery terminals, isolation resistance values, temperature of individual cells of one or more batteries, of modules of one or more batteries, and of one or more battery packs, current faults set, and fault history. Hi-fi data may be collected every 1-100 milliseconds (period associated with the second frequency). Hi-fi data may be collected for a duration of ten or more minutes, depending on the associated vehicle event (as described in more detail below). Examples of lo-fi data include vehicle GPS, speed data, state of charge of one or more batteries, available range on vehicle, charge connector state (e.g., plug/unplugged), and temperature of one or more battery packs. Lo-fi data may be collected every 1 second to 1 minute (period associated with the first frequency). The frequencies of hi-fi and lo-fi data may be determined based on a rate of change, sensitivity, and/or resolution of the data. For example, higher rate of change, higher sensitivity, and/or high resolution may be collected more frequently. In some embodiments, a size of hi-fi data is greater than a size of lo-fi data (because the second frequency is higher than the first frequency and/or a hi-fi data collection comprise more data than a lo-fi data collection). The granularity of hi-fi data may allow an issue associated with a vehicle event to be diagnosed more quickly. However, the cost of communicating this high-granularity data may be high (e.g., transmitting a large amount of data may be expensive and/or time-consuming), so it may be more cost-effective to identify a relevant portion of hi-fi data for determining vehicle diagnostic information without communicating hi-fi data unnecessary for this determination.

The method further comprises determining whether a vehicle event associated with the vehicle is occurring. In some embodiments, the vehicle event relates to an operational state of one or more electrical control units onboard the vehicle. In accordance with a determination of an occurrence of the vehicle event, a portion of the second data is identified. Based on the portion of the second data, the vehicle diagnostic information is determined, and the vehicle may receive the vehicle diagnostic information. In some embodiments, the vehicle diagnostic information indicates the operational state of the one or more electrical control units. In some embodiments, the vehicle diagnostic information comprises information for resolving an issue associated with the vehicle event (e.g., instructions for the vehicle, a user of the vehicle, an assisting advisor, or any combination thereof for resolving the issue).

For example, a battery is determined to be malfunctioning. A portion of hi-fi data collected from the Battery Management System (BMS) ECU before and after the malfunctioning event is transmitted by the vehicle. The portion of the hi-fi data may be data log from the BMS ECU indicating the battery issue. From the portion of the hi-fi data, the underlying problem and a repair plan may be determined via a server or a second electronic device and transmitted to the vehicle or an electronic device of a user.

By identifying the portion of the second data (e.g., hi-fi data) in accordance with the determination of vehicle event occurrence, the disclosed systems and methods allow vehicle diagnostic information to be more reliable and efficient. For example, the vehicle event may be more accurately described because the portion of the hi-fi data comprises high-resolution vehicle data surrounding the vehicle event, creating a timestamp and snapshot of the vehicle event and allowing the vehicle event to be more accurately quantified. Additionally, the relevant data for diagnosing and mitigating the vehicle event may be more accurately pinpointed, cost relating to communicating hi-fi data may be reduced.

FIG. 1 illustrates an example vehicle 100. Vehicle 100 may include multiple sensors 110, multiple cameras 120, and a control system 130. In some embodiments, vehicle 100 may be able to pair with a computing device 150 (e.g., smartphone 150a, tablet computing device 150b, or a smart vehicle accessory). As an example and not by way of limitation, a sensor 110 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 100 may include various controllable components (e.g., doors, seats, windows, lights, HVAC, entertainment system, security system), instrument and information displays and/or interactive interfaces, functionality to pair a computing device 150 with the vehicle (which may enable control of certain vehicle functions using the computing device 150), and functionality to pair accessories with the vehicle, which may then be controllable through an interactive interface in the vehicle or through a paired computing device 150.

Control system 130 may enables control of various systems on-board the vehicle. As shown in FIG. 1, control system 130 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality related to the battery pack of the vehicle. A Battery Management System (BMS) ECU may control and monitor a number of different aspects related to the electric vehicle battery system. Functions that may be controlled by the BMS may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with the BPI and BVT ECUs, and calculate state-of-charge (SoC) and battery state-of-health (SoH). A Battery Power Isolation (BPI) ECU may provide high-voltage sensing, measure the battery pack current, and facilitate determination of pack isolation. A Balancing Voltage Temperature (BVT) ECU may monitor battery module cell voltages, monitor temperature, and execute cell balancing. For example, as described in more detail below, the BMS ECU may collect and/or provide data about the battery pack of the vehicle for determining vehicle diagnostic information.

Features of embodiments as described herein may be controlled by a Thermal Management Module (TMM) ECU. The TMM ECU may provide electronic controls for HVAC components that control the temperature within a passenger cabin of the vehicle, including, by way of example and not limitation, sensing cabin temperature, heating and cooling of the cabin, and controlling HVAC mode (foot mode, defrost/demist), the electronic air compressor, the HVAC blower, the air vents, and the cabin heater. The TMM ECU may also or alternatively control heating and cooling of the battery pack and cooling of drive units (inverters), including, by way of example and not limitation, controlling the speed of the radiator fan, heating and cooling of energy storage system (ESS), monitoring ESS coolant temperature sensors, cooling of powertrain, and monitoring powertrain coolant temperature sensors. For example, as described in more detail below, the TMM ECU may collect and/or provide data about HVAC components of the vehicle for determining vehicle diagnostic information.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver. For example, as described in more detail below, the VDM ECU may collect and/or provide data about the vehicle's drivetrain, regenerative braking, suspension, steering, traction control, distribution of mass, aerodynamics, or driving modes for determining vehicle diagnostic information.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication. For example, as described in more detail below, VAS ECU may collect and/or provide data about the vehicle's passive/active wireless sensors for determining vehicle diagnostic information. The VAS ECU may also provide access for addressing a vehicle event associated with the vehicle (e.g., advisor access to repair/determine vehicle issue).

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 150, in-vehicle navigation, vehicle-to-vehicle communication, communication between the vehicle and landscape features (e.g., automated toll road sensors, automated toll gates, power dispensers at charging stations), or automated calling functionality. For example, as described in more detail below, the TCM ECU may collect and/or provide data about the vehicle's communications hardware for determining vehicle diagnostic information. The TCM ECU may also communicate data associated with the vehicle for determining vehicle diagnostic information and communicating the vehicle diagnostic information.

Features of embodiments as described herein may be controlled by one or more ECUs that provide functionality to control interior cabin components of the vehicle. A Seat Control Module (SCM) ECU may provide functionality to control seat movement (e.g., slide, tilt, recline, height, lumbar support), steering column movement (e.g., reach, rake), seat heater(s), or seat ventilation. A Door Control Module (DCM) ECU may provide functionality to sense outside ambient temperature or to control one or more components of a door of the vehicle, such as, by way of example and not limitation: window glass (e.g., moving the glass up or down), door locks, door handles (e.g., automatically moving in or out to facilitate grasping the handle), lamp(s), side mirror(s) (e.g., up, down, in, out, fold, unfold), mirror heater(s), electro-chromatic mirror dimmers, turn signals, approach lighting, spotlight(s), blind spot monitor lamp(s), or window switch lamp(s). For example, as described in more detail below, the SCM and DCM ECUs may collect and/or provide data about the vehicle's seats and doors, respectively, for determining vehicle diagnostic information.

Features of embodiments as described herein may be controlled by a Rear Zone Control (RZC) ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights. For example, as described in more detail below, the RZC ECU may collect and/or provide data about the vehicle's rear zone components (examples provided above) for determining vehicle diagnostic information.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking. Features of embodiments as described herein may be controlled by a Winch Control Module (WCM) ECU may provide functions to operate a winch mounted on or incorporated into the vehicle. The WCM ECU may control reeling the winch cable in and out, as well as control of a winch remote clutch. For example, as described in more detail below, the BCM and WCM ECUs may collect and/or provide data about components of the body of the vehicle (examples provided above) and the winch, respectively, for determining vehicle diagnostic information.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s). For example, as described in more detail below, the CGM ECU may collect and/or provide data about the vehicle's communications hub that connects and transfer data to and from the various ECUs, sensors, cameras, motors, and other vehicle components for determining vehicle diagnostic information. The CGM may provide an interface for collecting and/or providing data associated with these vehicle components for determining vehicle diagnostic information.

Features of embodiments as described herein may be controlled by one or more ECUs may provide functions of an automated driving system (ADS) and/or an advanced driver assistance system (ADAS) that may be enabled by a driver of the vehicle to provide one or more functions to support driving assistance and/or automation. An Autonomy Control Module (ACM) ECU may process data captured by cameras 120 and/or sensors 110. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 120 and/or sensors 110 in order to determine appropriate control commands. For example, as described in more detail below, the ADS, ADAS, ACM, ASM, and DMS ECUs may collect and/or provide data about functions to support driving assistance and/or automation for determining vehicle diagnostic information. The ADS, ADAS, ACM, ASM, or DMS ECU may determine occurrence of a vehicle event (e.g., an accident).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 130. In some embodiments, functions of the ACM and the XMM may be combined together into an Autonomous eXperience Module (AXM) ECU. For example, as described in more detail below, the XMM and AXM ECUs may collect and/or provide data about the user interface for determining vehicle diagnostic information. The XMM and AXM ECUs may also receive, via the user interface, input from a user associated with a vehicle event and/or vehicle diagnostic information.

Vehicle 100 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 2:
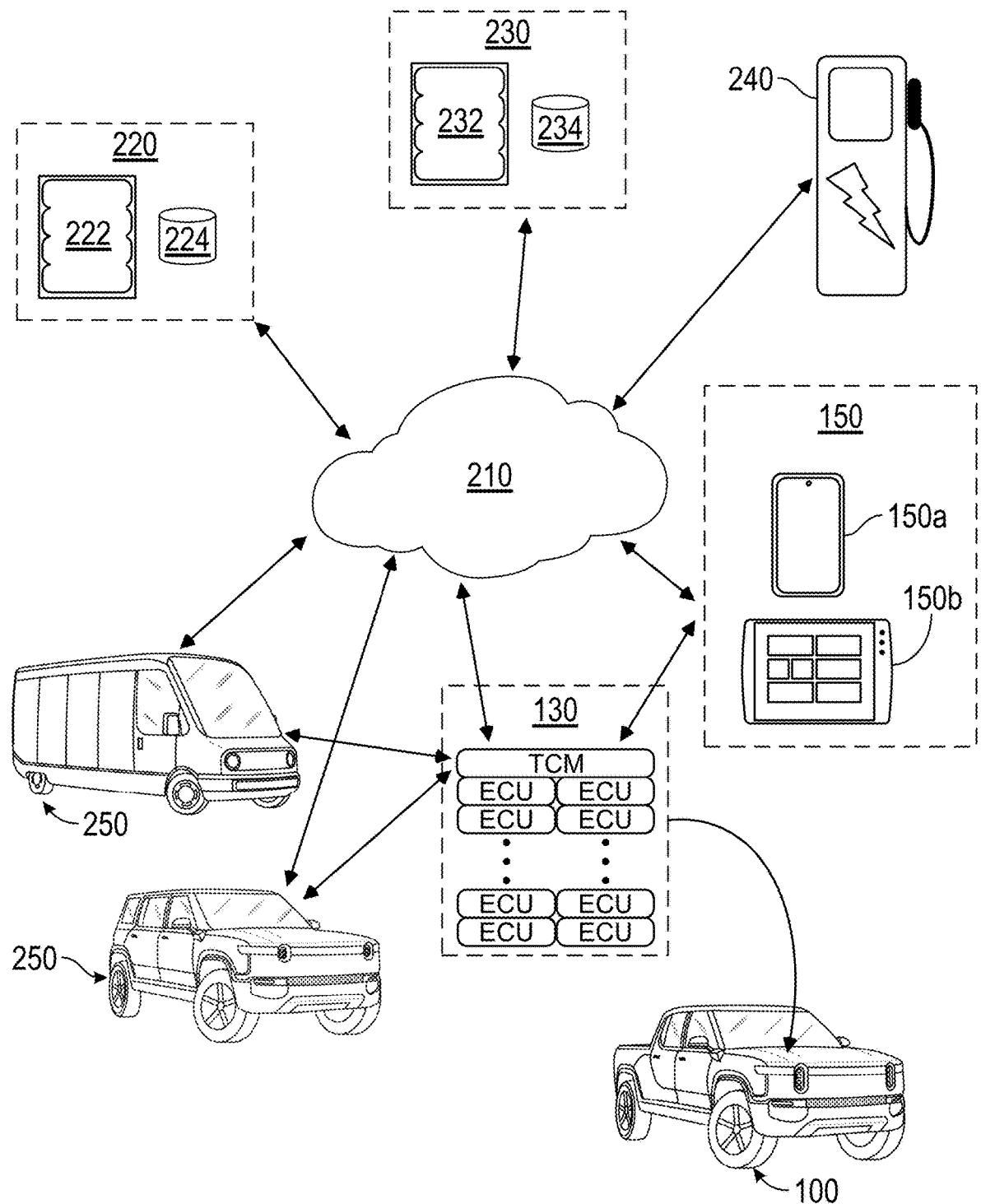
FIG. 2 illustrates an example network system including a connected vehicle.

FIG. 2 illustrates an example networked environment 200. Computer system 200 may include a connected vehicle 100 with a control system 130 that is capable of transmitting data to/from a network 210. Network 210 may also be connected to one or more computing servers 220 (e.g., including compute units 222 and storage units 224) associated with a vehicle manufacturer, a vehicle service provider, a vehicle fleet operator, or a vehicle-charging facility provider. Network 210 may also be connected to one or more third-party computing servers 230 (e.g., including compute units 232 and storage units 234) associated with, for example, a smart accessory manufacturer, a group event organizer, service provider, or a governmental organization. Networked environment 200 may include one or more landscape features 240 (e.g., automated toll road sensors, smart road signs or road markers, automated toll gates, power dispensers at charging stations, a vehicle diagnostic machine). Networked environment 200 may also include other connected vehicles 250 that may be capable of communicating with vehicle 100 through network 210 and/or directly with vehicle 100 (e.g., by communicating with a TCM ECU of a control system 130 of vehicle 100 when connected vehicle 250 is within range of a short-range communications network, such as Bluetooth). The connected vehicle 250 may be a service vehicle providing assistance to the vehicle 100 relating to the vehicle 100's event. Networked environment 200 may also include one or more computing devices 150 (e.g., smartphone 150a, a tablet computing device 150b, or a smart vehicle accessory) capable of communicating with network 210 and/or directly with vehicle 100. The one or more computing devices 150 may be associated with an advisor providing assistance to the vehicle 100 relating to the vehicle 100's event, as described in more detail below.

Networked environment 200 may enable transmission of data and communications between any of the depicted elements. The data being communicated may comprise data collected from an ECU of the vehicle 100, vehicle diagnostic information, communications with an advisor, or combination thereof. In some embodiments, such information may be communicated in one direction (e.g., a smart road sign broadcasting information related to traffic control or delays due to construction); in other embodiments, information may include two-way communications (e.g., an automated toll gate that processes a request received from vehicle 100 to deduct a toll from a specified account and provides confirmation of the transaction). In particular embodiments, one or more elements of networked environment 200 may include one or more computer systems, as described in further detail with respect to FIG. 6A. In particular embodiments, one or more elements of networked environment 200 perform one or more steps of one or more methods described or illustrated herein. In particular embodiments, software running on one or more elements of networked environment 200 may be controlled by a single entity to perform one or more steps of one or more methods described or illustrated herein or provide functionality described or illustrated herein.

FIGS. 3A(1) and 3A(2) illustrates an example flow chart 300 of vehicle diagnostic information communication. The flow chart 300 illustrates interactions between vehicle 302, user 304, advisor 306, and advisor 308. The vehicle 302 may be electric vehicle 100. User 304 may be a user of the vehicle 302 (e.g., a driver, a passenger, a mechanic working on the vehicle). The user 304 may provide input (e.g., via a user interface, via voice, via gesture) to the vehicle 302 for performing steps for communicating vehicle diagnostic information. Advisor 306 may be a service support advisor. The advisor 306 may be associated with a first electronic device (e.g., computing device 150), and the first electronic device may perform the steps for communicating vehicle diagnostic information. Advisor 308 may be a repair plan advisor, and the advisor 308 may be associated with a second electronic device (e.g., computing device 150), and the second electronic device may perform the steps for communicating vehicle diagnostic information. The vehicle 302, an electronic device associated with the user 304, and the electronic devices associated with the advisors may communicate over networked environment 200.

In this example, the process for communicating vehicle diagnostic information is initiated by the user 304. Based on information provided by the vehicle 302 and the user 304, a service request is created. Based on the service request and the information provided by the vehicle 302 and the user 304, a repair plan is created and communicated to the user 304 via the vehicle 302 and/or an electronic device associated with the user 304. Based on an input from the user 304, at least a part of the repair plan may proceed, or the repair plan may be declined.

As an example, after the user 304 notices an unusual battery behavior (e.g., via in-vehicle notification, via observation of abnormal battery consumption and/or charging behavior), the BMS ECU collected hi-fi data surrounding the vehicle event indicating a high-voltage battery issue. Additionally, the user may provide a picture of the battery. Based on these data, it is determined that the high-voltage battery issue is caused by poor connection. This information may be included in the repair plan. After the repair plan is created, the repair plan is communicated to the user. In some embodiments, as described in more detail herein, the usual battery behavior is detected by the vehicle 302 (e.g., via the BMS ECU).

At step 311, the user determines a need to request service. For example, the vehicle 302 is not operating as expected (e.g., the vehicle makes a strange noise, the vehicle is not charging, a part of the control system 130 is not operating as expected), and the user 304 determines or suspects an occurrence of a vehicle event. As another example, the vehicle 302 is stalled or was in an accident, and the user 304 determines the need to request assistance.

At step 312, the user navigates to the request service screen of the vehicle 302 or uses voice command to reach the service screen. For example, the request service screen is a user interface (e.g., user interface 400, as described in more detail below) of the vehicle 302 for receiving input from the user 304 (to allow the vehicle to determine occurrence of the vehicle event).

At step 313, the vehicle 302 takes a snapshot of high fidelity log data (e.g., hi-fi data) for a certain time range and sends the high fidelity log data to the cloud. For example, in accordance with a determination of occurrence of the vehicle event (after receiving an input from the user to confirm), the vehicle 302 identifies a portion of hi-fi data to transmit to the cloud (to e.g., server 220, the first electronic device associated with the advisor 306, the second electronic device associated with the advisor 308 (e.g., received at step 326), for determining vehicle diagnostic information (e.g., an underlying reason for causing the vehicle event, the repair plan)). In some embodiments, in addition to hi-fi data, lo-fi data are transmitted with the hi-fi data for determining vehicle diagnostic information.

In some embodiments, the hi-fi data comprise data collected from one or more components of the vehicle 302 (e.g., components described with respect to FIG. 1). In some embodiments, the portion of the hi-fi data comprises hi-fi data collected by the vehicle 302 from (1) a first amount of time prior to the vehicle event to (2) a second amount of time after the vehicle event. The first amount of time and the second amount of time may be determined based on the vehicle event. In some embodiments, the first amount of time is five minutes before the vehicle event, and the second amount of time is five minutes after the vehicle event. In some embodiments, to facilitate faster and/or lower cost data transmission, the first amount of time is less than five minutes before the vehicle event, and the second amount of time is less than five minutes after the vehicle event.

For example, the first amount of time and the second of time are smaller if the complexity or severity of the vehicle event is low or a confidence associated with troubleshooting an issue relating to the vehicle event is high (e.g., the issue is apparent to the user, the vehicle, or an advisor). As another example, the first amount of time and the second of time are higher if the complexity or severity of the vehicle event is high or a confidence associated with troubleshooting an issue relating to the vehicle event is low (e.g., the issue is not apparent to the user, the vehicle, or an advisor).

In some embodiments, the first amount of time and the second amount of time comprise a same amount of time. In some embodiments, the first amount time is greater than the second amount of time, for example, when vehicle data prior to the vehicle event is of greater interest for troubleshooting an issue relating to the vehicle event. In some embodiments, the second amount of time is greater than the first amount of time, for example, when vehicle data after the vehicle event is of greater interest for troubleshooting an issue relating to the vehicle event.

By identifying a portion of the hi-fi data in accordance with the determination of vehicle event occurrence, vehicle diagnostic information may be communicated and determined more reliably and efficiently. For example, the vehicle event may be more accurately described because the portion of the hi-fi data comprises high-resolution vehicle data surrounding the vehicle event, creating a timestamp and snapshot of the vehicle event and allowing the vehicle event to be more accurately quantified. Additionally, because the relevant data for diagnosing and mitigating the vehicle event may be more accurately pinpointed, cost relating to communicating hi-fi data may be reduced.

In some embodiments, the portion of hi-fi data is saved in the vehicle, and after a threshold amount of time (e.g., until service is completed, until vehicle is returned to the owner after service, after service is completed if additional analysis is required) after occurrence of the vehicle event, the vehicle removes the portion of hi-fi data. In some embodiments, the portion of hi-fi data is removed after a repair plan is determined. In some embodiments, the portion of hi-fi data is removed after the vehicle event is addressed.

In some embodiments, in addition to hi-fi data, additional data are collected from a sensor of the vehicle (e.g., a sensor as described with respect to FIG. 1, such as a camera, a microphone, proximity sensor, LiDAR sensor). A portion of this data may be transmitted with the portion of hi-fi data for determining vehicle diagnostic information, allowing the vehicle diagnostic information to be more accurately determined.

In some embodiments, the user determines a need to request service based on a noise issue observed by the user. At step 314, the vehicle 302 asks if the user 304 wants to add an ambient audio recording for noise issues (e.g., in response to receiving a user generated complaint about the noise issue). For example, the vehicle event comprises the vehicle 302 generating uncharacteristic noises, and in addition to identifying a portion of hi-fi data, the vehicle 302 may receive addition inputs for transmittal (to e.g., server 220, an electronic device of an advisor, for determining vehicle diagnostic information). In this example, the ambient audio may be recorded by an electronic device (e.g., computing device 150) of the user 304 and/or a sensor (e.g., a microphone) of the vehicle 302.

At step 315, the vehicle 302 receives an audio sample associated with the vehicle event (e.g., the noise issue). The vehicle 302 may attach the audio sample to a service ticket associated with the vehicle event when a form (described with respect to steps 319 and 320) associated with vehicle event is submitted.

It should be appreciated that the request for ambient audio recording is merely an example of additional information (in addition to data collected by the vehicle 302) to be communicated for determining vehicle diagnostic information. In some embodiments, this additional information comprise audio data, image data, video data, user input data (e.g., text input from user associated with the vehicle event), additional sensor data from one or more ECUs of the vehicle 302, or any combination thereof. By providing additional information from the user, the relevant data for diagnosing and mitigating the vehicle event may be more accurately pinpointed, cost relating to communicating data and identifying an underlying issue may be reduced. In some embodiments, the additional information is provided alternatively or additionally via an electronic device (e.g., an electronic device associated with the user 304) different from the vehicle 302.

At step 316, the vehicle 302 requests confirmation that the vehicle 302 is parked. The confirmation may be received via user 304 selection on a user interface (e.g., user interface 400, as described below) of the vehicle 302 or via voice command. It should be appreciated that this confirmation may be determined by the vehicle 302 via an ECU of the vehicle, in lieu of user confirmation. By confirming that the vehicle 302 is parked, the user 304 may safely provide additional information associated with the vehicle event (e.g., the user 304 may use a computing device 150 or the vehicle's user interface to provide additional information about the vehicle event), and the additional information may further assist the determination of vehicle diagnostic information. For example, step 314 may not be performed until the confirmation that the vehicle 302 is parked is received by the vehicle.

At step 317, if the confirmation that the vehicle 302 is parked is not received, the vehicle 302 communicates a message advising the user 304 that information associated with the vehicle event may be submitted once the vehicle is parked. This message may be an audio message provided by the vehicle 304 or displayed on a user interface of the vehicle 304.

At step 318, if the confirmation that the vehicle 302 is parked is not received, the vehicle 302 provides an affordance (e.g., a button appears on the user interface to override the inability to provide input about the vehicle event), and in response to selection of the affordance by the user 302, a form related to a service ticket associated with the vehicle event is displayed.

At step 319, in response to receiving the confirmation that the vehicle 302 is parked or in response to selection of the affordance at step 318, the vehicle 302 displays, on the user interface of the vehicle 304, the form related to a service ticket associated with the vehicle event. The form may request contact information (e.g., of user 304) and allow user to provide notes or answer questions about the vehicle event. The notes and/or answers may be provided via the user interface and/or voice input (for example, if the vehicle is not parked). Additionally or alternatively, the form may be displayed on an electronic device associated with the user 304.

At step 320, the user 304 submits the form related the service ticket. Information of the form may be transmitted by the vehicle 302 or the electronic device associated with the user 304 (to e.g., advisor 306). For example, the information of the form is transmitted in response to receiving a confirmation, via an input from the user 302, for submitting the form. Additional information (e.g., collected during steps 314-315) may be transmitted with the form information for determining vehicle diagnostic information. In some embodiments, if the confirmation that the vehicle 302 is parked is not received, steps 319 and 320 may be performed via voice commands, in lieu of user selections on a user interface.

At step 321, in accordance with a determination that the form (and additional information) is submitted, the vehicle 302 and/or an electronic device associated with the user 304 displays a message confirming the transmittal of the form (and the additional information).

At step 322, an electronic device of the advisor 306 receives the form (and additional information). The first electronic device associated with the advisor 306 may display information associated with the service ticket (e.g., hi-fi data from the vehicle, lo-fi data from the vehicle, the form, additional information, information about the vehicle 302 and/or user 304) for review.

At step 323, a determination of whether a sufficient amount of information is received is made. For example, a sufficient amount of information may be a necessary amount of information for advisor 306, the first electronic device associated with the advisor 306, and/or a server to determine a plan for addressing an issue associated with the vehicle event. The first electronic device associated with the advisor 306 may receive the information associated with the service ticket and determine whether a sufficient amount of information is received. The advisor 306 may alternatively or additionally review the received information and, based on the review, determine whether a sufficient amount of information is received.

At step 324, in accordance with a determination that a sufficient amount of information is not received, the user 304 is contacted for additional information. The first electronic device associated with the advisor 306 may communicate with the vehicle 302 or an electronic device associated with user 304 for requesting the additional information. For example, the advisor 306 may communicate with the user 304 via a phone call, text messaging, or email for requesting the additional information. As another example, the user interface of vehicle 304 or a user interface of the user's electronic device is updated to request the additional information.

At step 325, in accordance with a determination that a sufficient amount of information is received (after form submission or after step 324 is completed), a service request is created. The service request may be created by the first electronic device associated with the advisor 306 based on the information received at steps 322 and/or 324, and/or input from advisor 306 (after reviewing the information from the vehicle 302 and/or the user 304). The service request may be transmitted by the first electronic device associated with advisor 306 to the second electronic device associated with advisor 308.

At step 326, the service request and data associated with the vehicle (e.g., hi-fi and/or lo-fi data transmitted from vehicle 302 at step 313, additional data from steps 314-315) are evaluated. The service request and data may be received by the second electronic device associated with the advisor 308, and the service request and data may be presented by the second electronic device for the advisor 308's review. The service request and log data may be evaluated by the second electronic device or a server (e.g., server 220).

At step 327, a repair plan is created. For example, based on the service request and log data, the second electronic device determines an underlying reason for causing the vehicle event and a repair plan for addressing an issue associated with the vehicle event. Alternatively or additionally, the service request and data are transmitted to a server (e.g., to server 220 from vehicle 302, an electronic device of the user 304, the first electronic device associated with advisor 306, the second electronic device associated with advisor 308, or any combination thereof), and the server determines an underlying reason for causing the vehicle event and at least a part of the repair plan and transmits the part of the repair plan to the second electronic device. The repair plan may be determined based on an operational state of one or more electrical control units onboard the vehicle. For example, a component described with respect to FIG. 1 is determined to be malfunctioning based on the received hi-fi data, and the repair plan comprises instructions for repairing the malfunctioning component. The repair plan may also comprise information regarding the operational state of the one or more electrical control units associated with the vehicle event.

At step 328, the repair plan is communicated. For example, advisor 306 contacts the user 304 to discuss the repair plan over a phone call, text messaging, and/or email. As another example, the repair plan is transmitted to the vehicle 302 and/or an electronic device of user 304.

At step 329, a determination of whether to proceed with the repair plan is made. For example, after reviewing the repair plan (which was communicated at step 328), the user 302 provides an input indicating whether to proceed with the repair. The input may be provided to the user interface of the vehicle 302 or the electronic device associated with the user 304. The input may be provided during the discussion with advisor 306.

At step 330, in accordance with a determination to proceed with the repair plan or a part of the repair plan, an instruction to proceed is transmitted, for example, to the first electronic device associated with advisor 306. The instruction indicates the determination to proceed with the repair plan or the part of the repair plan (e.g., a part of the repair plan associated with a more critical or time-sensitive repair). In accordance with this determination, an appointment for addressing an issue associated with the vehicle event is scheduled and resources for addressing the issue are determined and requested (e.g., ordering parts, scheduling mechanics, reserving equipment). The appointment may be communicated and saved to the vehicle 302 and/or an electronic device associated with the user 304. The resources for addressing the issue may be determined and requested by the first electronic device associated with the advisor 306, the second electronic device associated with the advisor 308, the server 220, or any combination thereof. At step 331, the repair is performed.

At step 332, in accordance with a determination to not proceed with the repair plan, an instruction indicating that the repair plan is declined is transmitted, for example, to the first electronic device associated with advisor 306. The repair plan may be saved, and the appointment and resources for addressing the issue may be determined and requested at a later time (e.g., when the user 302 requests the repair in the future).

FIGS. 3B(1) and 3B(2) illustrates an example flow chart 350 of vehicle diagnostic information communication. The flow chart 350 illustrates interactions between vehicle 352, user 354, advisor 356, and advisor 358. The vehicle 352 maybe vehicle 302. The user 354 maybe user 302. The advisor 356 may be advisor 306. The advisor 358 may be advisor 308. The vehicle 352, an electronic device associated with the user 354, and electronic devices associated with the advisors may communicate over networked environment 200.

In this example, the process for communicating vehicle diagnostic information is initiated by the vehicle 352. Based on information provided by the vehicle 352 and the user 354, a service request is created. Based on the service request and the information provided by the vehicle 352 and the user 354, a repair plan is created and communicated to the user 354 via the vehicle 352 and/or an electronic device associated with the user 354. Based on an input from the user 354, at least a part of the repair plan may proceed, or the repair plan may be declined.

As an example, after the vehicle 352 notices an unusual battery behavior, the BMS ECU collected hi-fi data surrounding the vehicle event indicating a high-voltage battery issue. Additionally, the user may provide a picture of the battery. Based on this data, it is determined that the high-voltage battery issue is caused by poor connection. This information may be included in the repair plan. After the repair plan is created, the repair plan is communicated to the user.

At step 361, the vehicle 352 notifies user 354 of an issue. For example, the vehicle 352 determines an occurrence of a vehicle event. For example, the vehicle 352 determines that it is not operating as expected (e.g., the vehicle is not charging while coupled to a power dispenser, a part of the control system 130 is not operating as expected). As another example, the vehicle 352 is stalled or was in an accident (e.g., when an exterior sensor is damaged, an airbag/restraint module deploys), and the user 354 determines the need to request assistance. In accordance with this determination, the vehicle 352 notifies the user 352, for example, by generating a notification on the vehicle 352's user interface, by generating an audio alert, or by transmitting a notification to an electronic device associated with the user 352.

At step 362, the user 354 receives the notification of the issue. For example, the notification is received via the vehicle 352 and/or an electronic device associated with the user 354. At step 363, a determination of whether a service consultation is requested is made. For example, in addition to the notification of the issue, the vehicle 352 and/or the electronic device associated with the user 354 provide a request for an input to accept or decline service consultation. At step 364, in accordance with a determination that the service consultation request is not made (in response to receiving an input to decline service consultation), the vehicle 352 determines that a vehicle event is not occurring (and overriding the previous determination), and the process associated with flow chart 350 ends. The vehicle 352 and/or an electronic device associated with the user 354 may cease notification of the issue. The vehicle 352 may continue to operate.

At step 365, it is determined that the service consultation request is made. For example, after the user is notified of the issue, a request for service consultation is received by the vehicle 352 (e.g., via user selection on the user interface, via voice command) or by the electronic device associated with the user 354. Based on the received request, the vehicle 352 confirms that the determined occurrence of the vehicle event.

At step 366, the vehicle 352 takes a snapshot of high fidelity log data (e.g., hi-fi data) for a certain time range and sends the high fidelity log data to the cloud. For example, in accordance with a determination of occurrence of the vehicle event (after receiving an input from the user to confirm), the vehicle 352 identifies a portion of hi-fi data to transmit to the cloud (to e.g., server 220, the first electronic device associated with the advisor 306, the second electronic device associated with the advisor 358 (e.g., received at step 376), for determining vehicle diagnostic information). In some embodiments, in addition to hi-fi data, lo-fi data are transmitted with the hi-fi data for determining vehicle diagnostic information. Additional examples and advantages of this step was described with respect to step 313 of FIGS. 3A(1) and 3A(2). Step 366 may be performed in accordance with a determination that a service consultation request is made. In some embodiments, step 366 is performed in accordance with a determination of an occurrence of a vehicle event (e.g., after step 361). The time range associated with the snapshot of high fidelity log data may be determined to optimize an amount of high fidelity log data being transmitted (e.g., minimum amount of data for sufficiently determining vehicle diagnostic information associated with the vehicle event). In some embodiments, the time range is determined based on other logged data (e.g., based on number of event occurrences prior to a notification, based on duration of the event). In some embodiments, the time range is determined based on an output from a machine learning algorithm (e.g., from a server). For example, the machine learning algorithm provides an output for determining the time range based on similar vehicle events, and the output may be used to determine an optimized an amount of high fidelity log data being transmitted.

In some embodiments, the vehicle 302 asks if the user 304 wants to provide additional information (e.g., audio data, image data, video data, or any combination thereof) related to the vehicle event (e.g., an ambient audio recording for noise issues), similar to steps 314 and 315 of FIGS. 3A(1) and 3A(2).

At step 367, the vehicle 302 requests confirmation that the vehicle 352 is parked. The confirmation may be received via user 354 selection on a user interface (e.g., user interface 400, as described below) of the vehicle 352 or via voice command. It should be appreciated that this confirmation may be determined by the vehicle 352 via an ECU of the vehicle, in lieu of user confirmation. By confirming that the vehicle 352 is parked, the user 354 may safely provide additional information associated with the vehicle event (e.g., the user 354 may use a computing device 150 or the vehicle's user interface to provide additional information about the vehicle event), and the additional information may further assist the determination of vehicle diagnostic information.

At step 368, if the confirmation that the vehicle 352 is parked is not received, the vehicle 352 communicates a message advising the user 304 that information associated with the vehicle event may be submitted once the vehicle is parked. This message may be an audio message provided by the vehicle 354 or displayed on a user interface of the vehicle 354.

In some embodiments, if the confirmation that the vehicle 352 is parked is not received, the vehicle 352 provides an affordance (e.g., a button appears on the user interface), and in response to selection of the affordance by the user 352, a form related to a service ticket associated with the vehicle event is displayed.

At step 369, in response to receiving the confirmation that the vehicle 352 is parked or in response to selection of the affordance described above, the vehicle 352 displays, on the user interface of the vehicle 354, a form related to a service ticket associated with the vehicle event. The form may request contact information (e.g., of user 354) and allow user to provide notes or answer questions about the vehicle event. The notes and/or answers may be provided via the user interface and/or voice input. Additionally or alternatively, the form may be displayed on an electronic device associated with the user 354.

At step 370, the user 354 submits the form related the service ticket. Information of the form may be transmitted by the vehicle 352 or the electronic device associated with the user 354 (to e.g., advisor 306). For example, the information of the form is transmitted in response to receiving a confirmation, via an input from the user 302, for submitting the form. Additional information (e.g., collected during steps similar to steps 314-315) may be transmitted with the form information for determining vehicle diagnostic information. In some embodiments, if the confirmation that the vehicle 302 is parked is not received, steps 369 and 370 may be performed via voice commands, in lieu of user selections on a user interface.

At step 371, in accordance with a determination that the form (and additional information) is submitted, the vehicle 352 and/or the electronic device associated with user 354 displays a message confirming the transmittal of the form (and the additional information).

At step 372, an electronic device of the advisor 356 receives the form (and additional information). The first electronic device associated with the advisor 356 may display information associated with the service ticket (e.g., hi-fi data from the vehicle, lo-fi data from the vehicle, the form, additional information, information about the vehicle 352 and/or user 354) for review.

At step 373, a determination of whether a sufficient amount of information is received is made. For example, a sufficient amount of information may be a necessary amount of information for advisor 356, the first electronic device associated with advisor 356, and/or a server to determine a plan for addressing an issue associated with the vehicle event. The first electronic device associated with the advisor 356 may receive the information associated with the service ticket and determine whether a sufficient amount of information is received. The advisor 356 may alternatively or additionally review the received information and, based on the review, determine whether a sufficient amount of information is received.

At step 374, in accordance with a determination that a sufficient amount of information is not received, the user 354 is contacted for additional information. The first electronic device associated with the advisor 356 may communicate with the vehicle 352 or an electronic device associated with user 354 for requesting the additional information. For example, the advisor 356 may communicate with the user 354 via a phone call, text messaging, or email for requesting the additional information. As another example, the user interface of vehicle 354 or a user interface of the user's electronic device is updated to request the additional information.

At step 375, in accordance with a determination that a sufficient amount of information is received (after form submission or after step 374 is completed), a service request is created. The service request may be created by the first electronic device associated with the advisor 356 based on the information received at steps 372 and/or 374, and/or input from advisor 356 (after reviewing the information from the vehicle 352 and/or the user 354). The service request may be transmitted by the first electronic device associated with advisor 356 to the second electronic device associated with advisor 358.

At step 376, the service request and data associated with the vehicle (e.g., hi-fi and/or lo-fi data transmitted from vehicle 352 at step 366, additional data from steps 314-315) are evaluated. The service request and log data may be received by the second electronic device associated with the advisor 358, and the service request and data may be presented by the second electronic device for the advisor 358's review. The service request and log data may be evaluated by the second electronic device or a server (e.g., server 220).

At step 377, a repair plan is created. For example, based on the service request and log data, the second electronic device determines a repair plan for addressing an issue associated with the vehicle event. Alternatively or additionally, the service request and log data are transmitted to a server (e.g., to server 220 from vehicle 352, an electronic device of the user 354, the first electronic device associated with advisor 356, the second electronic device associated with advisor 358, or any combination thereof), and the server determines at least a part of the repair plan and transmits the part of the repair plan to the second electronic device. The repair plan may be determined based on an operational state of one or more electrical control units onboard the vehicle. For example, a component described with respect to FIG. 1 is determined to be malfunctioning based on the received hi-fi data, and the repair plan comprises instructions for repairing the malfunctioning component. The repair plan may also comprise information regarding the operational state of the one or more electrical control units associated with the vehicle event.

At step 378, the repair plan is communicated. For example, advisor 356 contacts the user 354 to discuss the repair plan over a phone call, text messaging, and/or email. As another example, the repair plan is transmitted to the vehicle 352 and/or an electronic device of user 354.

At step 379, a determination of whether to proceed with the repair plan is made. For example, after reviewing the repair plan (which was communicated at step 378), the user 352 provides an input indicating whether to proceed with the repair. The input may be provided to the user interface of the vehicle 352 or the electronic device associated with the user 354. The input may be provided during the discussion with advisor 356.

At step 380, in accordance with a determination to proceed with the repair plan or a part of the repair plan, an instruction to proceed is transmitted, for example, to the first electronic device associated with advisor 356. The instruction indicates the determination to proceed with the repair plan or the part of the repair plan (e.g., a part of the repair plan associated with a more critical or time-sensitive repair). In accordance with this determination, an appointment for addressing an issue associated with the vehicle event is scheduled and resources for addressing the issue are determined and requested (e.g., ordering parts, scheduling mechanics, reserving equipment). The appointment may be communicated and saved to the vehicle 302 and/or an electronic device associated with the user 354. The resources for addressing the issue may be determined and requested by the first electronic device associated with the advisor 306, the second electronic device associated with the advisor 358, the server 220, or any combination thereof. At step 381, the repair is performed.

At step 382, in accordance with a determination to not proceed with the repair plan, an instruction indicating that the repair plan is declined is transmitted, for example, to the first electronic device associated with advisor 356. The repair plan may be saved, and the appointment and resources for addressing the issue may be determined and requested at a later time (e.g., when the user 352 requests the repair in the future).

Although the flow charts 300 and 350 illustrate specific steps and order of steps, it should be appreciated that the illustrate steps are exemplary. A process for communicating vehicle diagnostic information may comprise additional steps, fewer steps, or different order of steps. It should also be appreciated that the steps may be performed by a device different than ones described in the flow charts. For example, some steps described with respect to the flow chart may be performed by a third electronic device (e.g., server 220), instead of the vehicle 302 or an electronic device of an advisor. Furthermore, the steps may be performed at different times. For example, after receiving information associated with the vehicle event, the electronic device of an advisor may not immediately respond to the vehicle and/or user. It should also be appreciated that some steps may be performed by a device, instead of a user or an advisor. For example, instead of receiving a confirmation that the vehicle is parked, the vehicle 302 or 352 may determine, via an ECU of the vehicle, that it is parked. As another example, the repair plan may be determined by the second electronic device of the advisor 308 or 358 or server 220.

It should also be appreciated that the devices and parties described with respect to flow charts 300 and 350 are exemplary. For example, more than one electronic device may be used for performing steps associated with the user 304, advisor 306, and/or advisor 308. As another example, more than one advisor may be associated with the steps associated with advisor 306 and/or advisor 308. As another example, one advisor may perform steps associated with advisor 306 and advisor 308.

As another example, the vehicle diagnostic information may be determined and communicated without an advisor. For example, the vehicle and/or the user may communicate directly with an electronic device (e.g., server 220, an electronic device associated with the user) for determining the vehicle diagnostic information (e.g., an underlying reason for causing the vehicle event, repair plan). As another example, the vehicle itself may determine the vehicle diagnostic information. Based on the vehicle diagnostic information, the user may address the vehicle event himself or herself, or the user may schedule an appointment to address the vehicle event.

As another example, the vehicle may transmit data to an entity different from an advisor. For example, vehicle data (e.g., hi-fi data, lo-fi data, additional data provided by user, additional data provided by vehicle) may be transmitted (e.g., to the police, to insurance company) for accident investigation and/or repair estimates.

Figure 4:
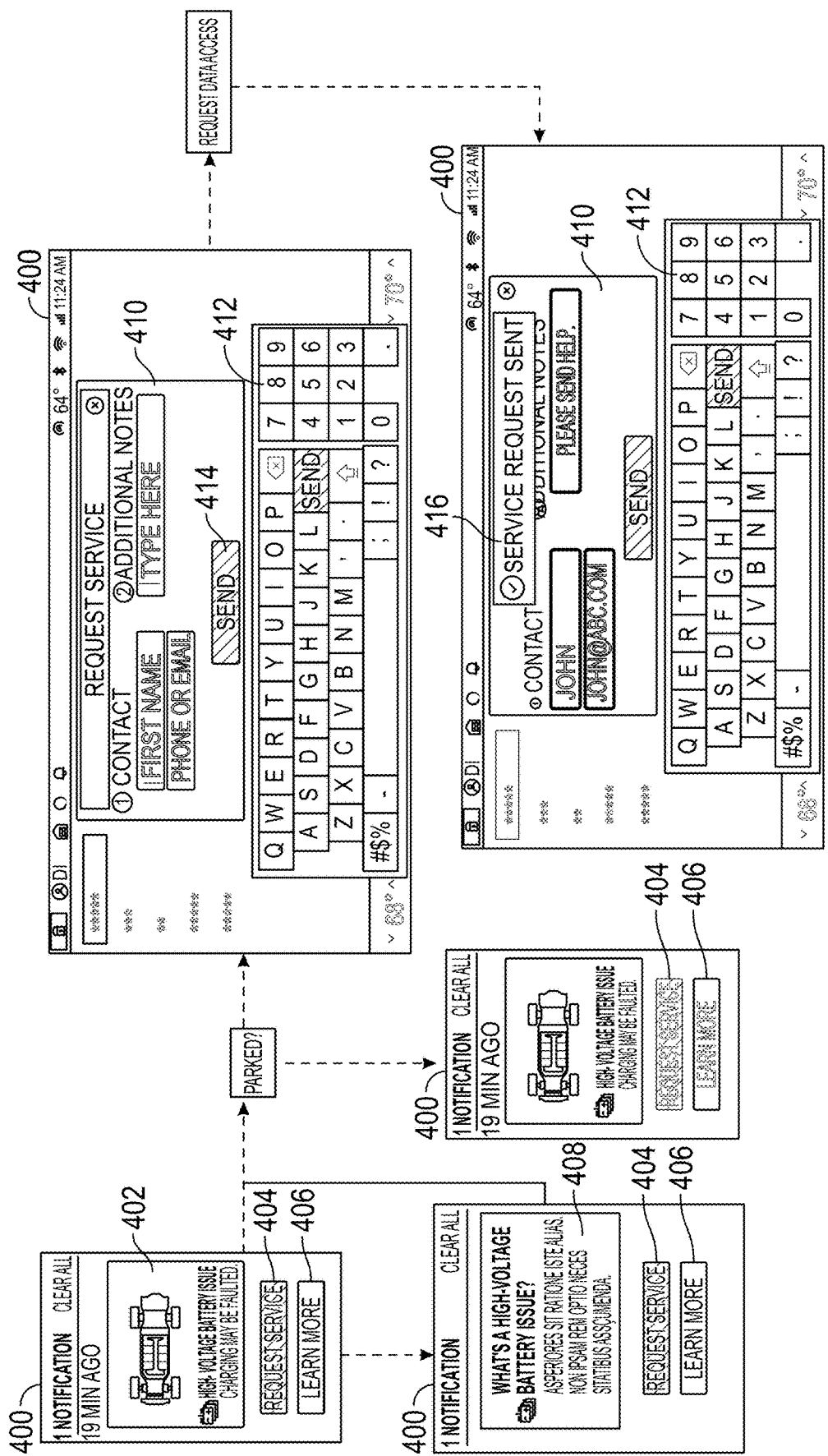
FIG. 4 illustrates an example user interface.

FIG. 4 illustrates example user interface 400. In some embodiments, the user interface 400 is configured to receive inputs (e.g., from user 304 or 354) for determining vehicle diagnostic information. The user interface 400 may be a user interface of the vehicle 100, 302, or 352. The user interface 400 may be a user interface of an electronic device associated with user 304 or 354.

In this example, the user interface 400 provides information relating to a battery issue (e.g., the vehicle event) and requests input from a user. The input from the user may be transmitted and used to determine vehicle diagnostic information. For example, FIG. 4 illustrates an example user interface 400 for providing vehicle event information and requesting user input associated with steps 311-320 of FIGS. 3A(1) and 3A(2) or steps 361-370 of FIGS. 3B(1) and 3B(2).

In accordance with a determination of an occurrence of a vehicle event, the user interface 400 presents information 402 about the vehicle event. In this example, the vehicle event comprises a high-voltage battery issue. Additionally, in accordance with this determination the user interface 400 presents options 404 and 406. For example, selection of option 404 indicates a request for servicing an issue associated with the vehicle event (in this example, servicing the battery issue), and selection of option 406 indicates a request for additional information about the vehicle event.

In some embodiments, if the vehicle is not parked (e.g., a confirmation, described with respect to step 316 in FIGS. 3A(1) and 3A(2) or step 367 in FIGS. 3B(1) and 3B(2), is not received), the options 404 and/or 406 are presented but are not selectable. That is, if the vehicle is not parked, selection of options 404 and/or 406 would not cause the user interface 400 to update. In some embodiments, if the vehicle is not parked (e.g., a confirmation, described with respect to step 316 in FIGS. 3A(1) and 3A(2) or step 367 in FIGS. 3B(1) and 3B(2), is not received), the options 404 and/or 406 are selectable via a voice command, but not via a user touch input.

In response to receiving selection of option 406, the user interface 400 is updated to present information 408, which comprises additional information about the vehicle event (in this example, additional information about the battery issue). In response to receiving selection of option 404, the user interface 400 is updated to present form 410. The form 410 may be the form related to a service request, as described with respect to steps 319-320 in FIGS. 3A(1) and 3A(2) or steps 369-370 in FIGS. 3B(1) and 3B(2). As illustrated, the form 410 comprises requests for contact information (e.g., of user 304 or 354) and notes about the vehicle event. The form may be filled out via keyboard 412 of the user interface 400 or via voice input (e.g., if the vehicle is not parked). After the form is completed, selection of the send user interface object 414 causes information of the form to be transmitted (e.g., as described with respect to step 320 or 370). After the information of the form is transmitted, the user interface 400 is updated to present a confirmation 416.

Although the example user interface 400 is described with respect to one display of one device, it should be appreciated that components of user interface 400 may be displayed on different displays and different devices.

Figure 5:
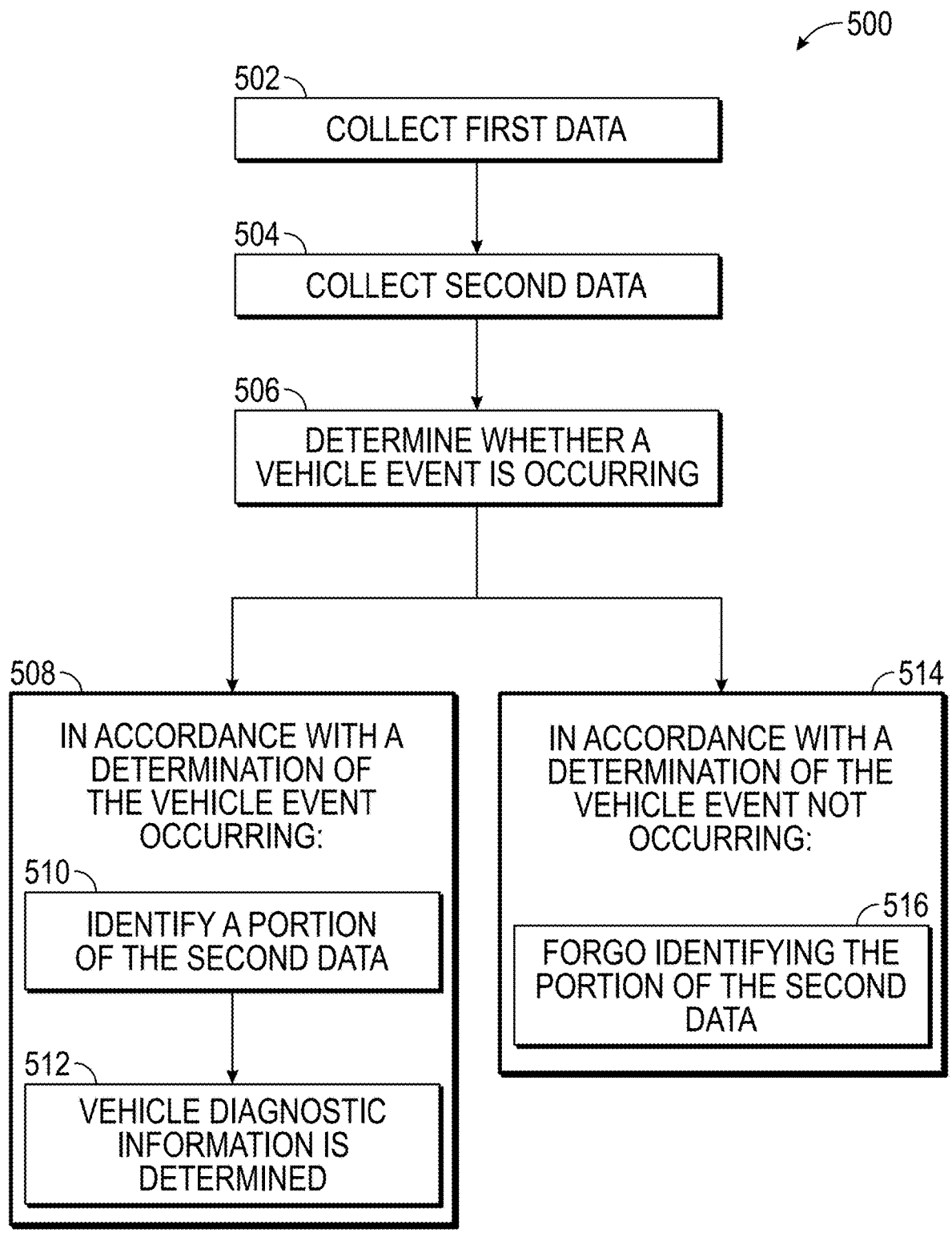
FIG. 5 illustrates an example method for communicating vehicle diagnostic information.

FIG. 5 illustrates an example method 500 for communicating vehicle diagnostic information. The steps of method 500 may be performed by vehicle 100, vehicle 302, vehicle 352, an electronic device associated with an advisor, an electronic device described with respect to FIG. 2 (e.g., computing device 150, server 220), or any combination thereof, as described with respect to FIGS. 1-4. It is appreciated that the steps of method 500 leverage the features and advantages described with respect to FIGS. 1-4.

In some embodiments, the method 500 comprises collecting first data associated with a vehicle at a first frequency (step 502). For example, as described with respect to FIGS. 1-4, a disclosed vehicle (e.g., vehicle 100, vehicle 302, vehicle 352) collects lo-fi data at a first frequency.

In some embodiments, the method 500 comprises collecting second data associated with the vehicle at a second frequency (step 504). For example, as described with respect to FIGS. 1-4, a disclosed vehicle (e.g., vehicle 100, vehicle 302, vehicle 352) collects hi-fi data at a second frequency. In some embodiments, the second frequency is higher than the first frequency, and a size of the second data is greater than a size of the first data. For example, as described with respect to FIGS. 1-4, hi-fi data may be collected every 1-10 milliseconds, and lo-fi data may be collected every 15 seconds to 1 minute.

In some embodiments, the method 500 comprises determining whether a vehicle event associated with the vehicle is occurring (step 506). For example, as described with respect to FIGS. 3A(1) and 3A(2), the vehicle determines that the vehicle event is occurring in response to receiving an input from the user at step 312. As another example, as described with respect to FIGS. 3B(1) and 3B(2), the vehicle determines that the vehicle event is occurring at step 361. In some embodiments, the vehicle event relates to an operational state of one or more electrical control units onboard the vehicle. As describe with respect to FIG. 4, an example of a vehicle event comprises a high-voltage battery issue, and an operational state the BMS ECU indicates the high-voltage battery issue (e.g., the BMS ECU determines that the battery voltage is higher than a normal operating range). In some embodiments, the vehicle event relates to an operational state of one or more electrical control units described with respect to FIG. 1.

In some embodiments, the method 500 comprises in accordance with a determination of an occurrence of the vehicle event (step 508), identifying a portion of the second data (step 510), and vehicle diagnostic information is determined (step 512). In some embodiments, the portion of the second data comprises second data collected from (1) a first amount of time prior to the vehicle event to (2) a second amount of time after the vehicle event, and the first amount of time and the second amount of time are determined based on the vehicle event.

For example, as described with respect to FIGS. 3A(1) and 3A(2) at step 313 and FIGS. 3B(1) and 3B(2) at step 366, a portion of hi-fi data is identified in accordance with a determination of vehicle event occurrence. Vehicle diagnostic information may be determined by the vehicle or by another electronic device (e.g., a server described with respect to FIG. 2) based on the portion of hi-fi data, as described. For example, the first amount of time and the second of time are smaller if the complexity or severity of the vehicle event is low or a confidence associated with troubleshooting an issue relating to the vehicle event is high (e.g., the issue is apparent to the user, the vehicle, or an advisor). As another example, the first amount of time and the second of time are higher if the complexity or severity of the vehicle event is high or a confidence associated with troubleshooting an issue relating to the vehicle event is low (e.g., the issue is not apparent to the user, the vehicle, or an advisor).

In some embodiments, the first amount of time and the second amount of time comprise a same amount of time. In some embodiments, the first amount time is greater than the second amount of time, for example, when vehicle data prior to the vehicle event is of greater interest for troubleshooting an issue relating to the vehicle event. In some embodiments, the second amount of time is greater than the first amount of time, for example, when vehicle data after the vehicle event is of greater interest for troubleshooting an issue relating to the vehicle event.

By identifying a portion of the hi-fi data in accordance with the determination of vehicle event occurrence, vehicle diagnostic information may be communicated and determined more reliably and efficiently. For example, the vehicle event may be more accurately described because the portion of the hi-fi data comprises high-resolution vehicle data surrounding the vehicle event, creating a timestamp and snapshot of the vehicle event and allowing the vehicle event to be more accurately quantified. Additionally, because the relevant data for diagnosing and mitigating the vehicle event may be more accurately pinpointed, cost relating to communicating hi-fi data may be reduced.

In some embodiments, the vehicle diagnostic information is determined based on the portion of the second data. For example, as described with respect to FIGS. 3A(1), 3A(2), 3B(1) and 3B(2), an operational state of one or more electrical control units onboard the vehicle is determined based on the portion of the identified hi-fi data (e.g., by server 220, by an electronic device associated with advisor 308 or 358), and a repair plan is determined based on the operational state.

In some embodiments, the second data are collected from the one or more electrical control units. For example, a disclosed vehicle (e.g., vehicle 100, vehicle 302, vehicle 352) collects hi-fi data from one or more electrical control units described with respect to FIG. 1. In some embodiments, the portion of the second data comprises data collected from an electrical control unit associated with the vehicle event (e.g., one or more electrical control units described with respect to FIG. 1 associated with the vehicle event). For example, as described with respect to FIG. 4, the vehicle event comprises a high-voltage battery issue, and the identified hi-fi data comprise data collected from the BMS ECU.

In some embodiments, the vehicle diagnostic information indicates the operational state of the one or more electrical control units. For example, as described with respect to FIGS. 3A(1), 3A(2), 3B(1), 3B(2), and 4, the repair plan comprises information regarding the operational state of the one or more electrical control units associated with the vehicle event (for example, the BMS ECU collected hi-fi data indicating a high-voltage battery issue) and instructions for repairing or replacing the malfunctioning component.

In some embodiments, the method 500 comprises in response to receiving the vehicle diagnostic information, requesting an input from a user of the vehicle. For example, as described with respect to FIGS. 3A(1), 3A(2), 3B(1), and 3B(2), in response to receiving the repair plan, the vehicle or an electronic device of the user requests an input from the user (e.g., for proceeding with at least a portion of the repair plan or declining the repair plan). The method 500 comprises in response to the request, receiving an input from the user of the vehicle, and in response to receiving the input, transmitting an instruction to address the vehicle event. For example, in response to the request, an input is received from the user to proceed with at least a portion of the repair plan. In response to receiving the input to proceed with at least a portion of the repair plan, an instruction to proceed with the repair to address the vehicle event is transmitted (e.g., from the vehicle, from an electronic device of the user).

In some embodiments, the method 500 comprises in response to the request, receiving an input from the user of the vehicle, and in response to receiving the input, transmitting an instruction to not address the vehicle event. For example, as described with respect to FIGS. 3A(1), 3A(2), 3B(1) and 3B(2), in response to receiving the repair plan, the vehicle or an electronic device of the user requests an input from the user (e.g., for proceeding with at least a portion of the repair plan or declining the repair plan). In response to the request, an input is received from the user to decline the repair plan. In response to receiving the input to decline the repair plan, an instruction to decline the repair and not address the vehicle event is transmitted (e.g., from the vehicle, from an electronic device of the user).

In some embodiments, the method 500 comprises removing the portion of the second data a threshold amount of time after the occurrence of the vehicle event. For example, as described with respect to FIGS. 3A(1), 3A(2), 3B(1), and 3B(2), after, e.g., service is completed, vehicle is returned to the owner after service, the portion of hi-fi data, determined based on the vehicle event, is removed by the vehicle to increase data storage.

In some embodiments, the method 500 comprises in accordance with a determination that the vehicle event is not occurring (step 514), forgoing identifying the portion of the second data (step 516). For example, when a disclosed vehicle (e.g., vehicle 100, vehicle 302, vehicle 352) does not determine that a vehicle event is occurring, it does not identify any hi-fi data.

In some embodiments, the method 500 comprises receiving an input from a user of the vehicle. Based on the received input, a determination the vehicle event is not occurring is made. For example, as described with respect to FIGS. 3B(1) and 3B(2) at step 364, in response to receiving an input from the user to not request service consultation, the vehicle 352 determines that the vehicle event is not occurring, and hi-fi data are not identified.

In some embodiments, the method 500 comprises receiving an input from a user of the vehicle, wherein the occurrence of the vehicle event is determined based on the first input. For example, as described with respect to FIGS. 3B(1) and 3B(2) at step 365, in response to receiving an input from the user to request service consultation, the vehicle 352 determines that the vehicle event is occurring.

In some embodiments, the method 500 comprises in accordance with the determination of the occurrence of the vehicle event, requesting an input from a user of the vehicle. In some embodiments, the method 500 comprises in response to the request of the input, receiving an input from the user of the vehicle, and transmitting the input, wherein the vehicle diagnostic information is determined further based on the input. For example, as described with respect to FIGS. 3A(1), 3A(2), 3B(1), and 3B(2), after the determination of vehicle event occurrence, additional information may be requested from the user. As described with respect to steps 314 and 315 of FIGS. 3A(1) and 3A(2), the additional information may comprise a selection on a graphical user interface of the vehicle, a media file associated with the vehicle event, a voice input, or a combination thereof. In some embodiments, the input is requested further in accordance with a determination the vehicle is parked. For example, as described with respect to FIGS. 3A(1), 3A(2), 3B(1), 3B(2), and 4, the vehicle requests for an input when the vehicle is determined to be parked, allowing the input to be provided safely.

In some embodiments, the method 500 comprises in accordance with the determination of the occurrence of the vehicle event, transmitting the first data. The vehicle diagnostic information is determined further based on the first data. For example, as described with respect to FIGS. 3A(1), 3A(2), 3B(1), and 3B(2), lo-fi data are transmitted (with the portion of hi-fi data) in accordance with the determination of vehicle event occurrence.

In some embodiments, the method 500 comprises collecting third data from an output of a sensor of the vehicle, and in accordance with the determination that the occurrence of the vehicle event, transmitting a portion of the third data. The vehicle diagnostic information is determined further based on the portion of the third data. For example, in addition to hi-fi data, data may be collected from a sensor of the vehicle (e.g., a sensor as described with respect to FIG. 1). A portion of this data may be transmitted with the portion of hi-fi data for determining vehicle diagnostic information.

In some embodiments, the method 500 comprises in accordance with the determination that the occurrence of the vehicle event, transmitting an instruction to assist with the vehicle event. For example, the vehicle event comprises a vehicle accident (and the user may not be able to request assistance), and in accordance with a determination of the accident, the vehicle transmits an instruction (e.g., to emergency services, towing services) to assist with the accident.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for charging an electric vehicle fleet including the particular steps of the method of FIG. 5, this disclosure contemplates any suitable method for charging an electric vehicle fleet including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figures 6A, 6B:
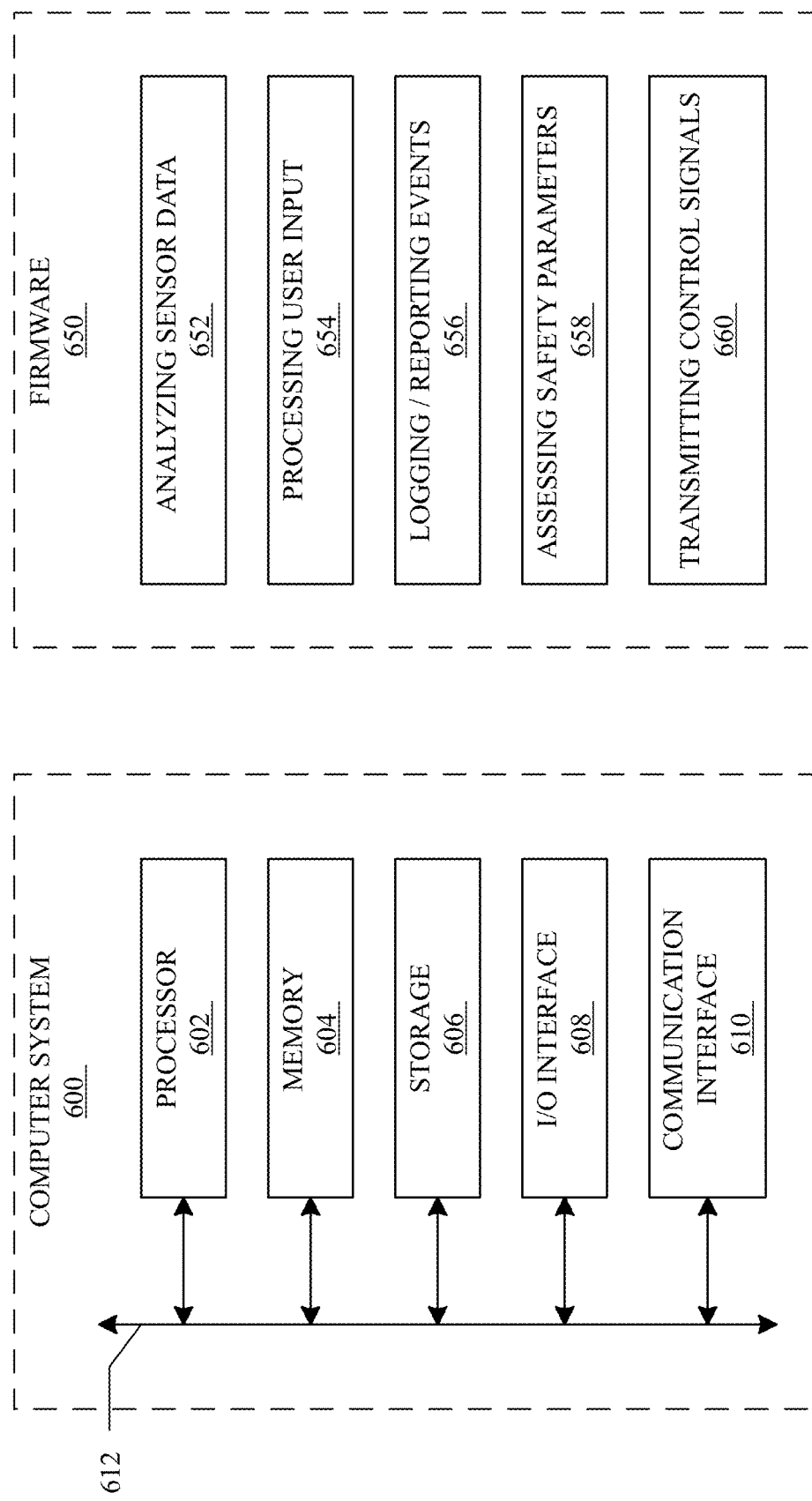
FIG. 6A is a schematic of an example computer system.
FIG. 6B illustrates example firmware for a vehicle ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 (e.g., compute units 222 and 232) may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units 224 and 234). Processor 602 may include one or more internal caches for data, instructions, or addresses.

In particular embodiments, memory 604 includes main memory for storing instructions for processor 602 to execute or data for processor 602 to operate on. In particular embodiments, one or more memory management units (MMUs) reside between processor 602 and memory 604 and facilitate accesses to memory 604 requested by processor 602. In particular embodiments, memory 604 includes random access memory (RAM). This disclosure contemplates any suitable RAM.

In particular embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In particular embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 100 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 110 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In particular embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 130. Firmware 650 may include functions 652 for analyzing sensor data based on signals received from sensors 110 or cameras 120 received through communication interface 610. Firmware 650 may include functions 654 for processing user input (e.g., directly provided by a driver of vehicle 100, passenger in vehicle 100, user 304, or user 354, or provided through a computing device 150) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). The functions 556 may collect the disclosed hi-fi and lo-fi data for transmittal and determination of vehicle diagnostic data, and the collected data may be stored in storage 606. Firmware 650 may include functions 658 for assessing safety parameters (e.g., monitoring the temperature of a vehicle battery or the distance between vehicle 100 and nearby vehicles). Firmware 650 may include functions 660 for transmitting control signals to components of vehicle 100, including other vehicle ECUs 600.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some embodiments, a method comprises: collecting first data associated with a vehicle at a first frequency; collecting second data associated with the vehicle at a second frequency. The second frequency is higher than the first frequency, and a size of the second data is greater than a size of the first data. The method further comprises determining whether a vehicle event associated with the vehicle is occurring. The vehicle event relates to an operational state of one or more electrical control units onboard the vehicle. The method further comprises in accordance with a determination of an occurrence of the vehicle event: identifying a portion of the second data. The portion of the second data comprises second data collected from (1) a first amount of time prior to the vehicle event to (2) a second amount of time after the vehicle event. The first amount of time and the second amount of time are determined based on the vehicle event. Vehicle diagnostic information is determined based on the portion of the second data.

In some embodiments, the method further comprises receiving a first input from a user of the vehicle, wherein the occurrence of the vehicle event is determined based on the first input.

In some embodiments, the method further comprises: receiving a second input from a user of the vehicle; in response to receiving the second input, determining that the vehicle event is not occurring; and in accordance with the determination that the vehicle event is not occurring, forgoing transmitting the portion of the second data.

In some embodiments, the method further comprises in accordance with the determination of the occurrence of the vehicle event, requesting an input from a user of the vehicle.

In some embodiments, the method further comprises: in response to the request, receiving a third input from the user of the vehicle; and transmitting the third input. The vehicle diagnostic information is determined further based on the third input.

In some embodiments, the input is requested further in accordance with a determination the vehicle is parked.

In some embodiments, the input comprises a selection on a graphical user interface of the vehicle, a media file associated with the vehicle event, a voice input, or a combination thereof.

In some embodiments, the second data are collected from the one or more electrical control units.

In some embodiments, the portion of the second data comprises data collected from an electrical control unit associated with the vehicle event.

In some embodiments, the method further comprises in accordance with the determination of the occurrence of the vehicle event, transmitting the first data, wherein the vehicle diagnostic information is determined further based on the first data.

In some embodiments, the first amount of time and the second amount of time are determined based on a severity of the vehicle event.

In some embodiments, the method further comprises: in response to receiving the vehicle diagnostic information, requesting an input from a user of the vehicle; in response to the request, receiving a fourth input from the user of the vehicle; and in response to receiving the fourth input, transmitting an instruction to address the vehicle event.

In some embodiments, the method further comprises: in response to receiving the vehicle diagnostic information, requesting an input from a user of the vehicle; in response to the request, receiving a fifth input from the user of the vehicle; and in response to receiving the fifth input, transmitting an instruction to not address the vehicle event.

In some embodiments, the method further comprises: collecting third data from an output of a sensor of the vehicle; and in accordance with the determination that the occurrence of the vehicle event, transmitting a portion of the third data. The vehicle diagnostic information is determined further based on the portion of the third data.

In some embodiments, the method further comprises in accordance with the determination that the occurrence of the vehicle event, transmitting an instruction to assist with the vehicle event.

In some embodiments, a system comprises: a vehicle comprising one or more electrical control units; a server; and one or more processors configured to cause the system to perform a method comprising: collecting first data associated with the vehicle at a first frequency; collecting second data associated with the vehicle at a second frequency. The second frequency is higher than the first frequency, and a size of the second data is greater than a size of the first data. The method further comprises determining whether a vehicle event associated with the vehicle is occurring. The vehicle event relates to an operational state of the one or more electrical control units. The method further comprises in accordance with a determination of an occurrence of the vehicle event: identifying a portion of the second data. The portion of the second data comprises second data collected from (1) a first amount of time prior to the vehicle event to (2) a second amount of time after the vehicle event. The first amount of time and the second amount of time are determined based on the vehicle event. Vehicle diagnostic information is determined based on the portion of the second data.

In some embodiments, the method further comprises receiving a first input from a user of the vehicle, wherein the occurrence of the vehicle event is determined based on the first input.

In some embodiments, the second data are collected from the one or more electrical control units.

In some embodiments, a non-transitory computer readable storage medium stores one or more programs, the one or more programs comprising instructions, which when executed by a system with one or more processors and memory, cause the system to perform a method comprising: collecting first data associated with the vehicle at a first frequency; collecting second data associated with the vehicle at a second frequency. The second frequency is higher than the first frequency, and a size of the second data is greater than a size of the first data. The method further comprises determining whether a vehicle event associated with the vehicle is occurring. The vehicle event relates to an operational state of the one or more electrical control units. The method further comprises in accordance with a determination of an occurrence of the vehicle event: identifying a portion of the second data. The portion of the second data comprises second data collected from (1) a first amount of time prior to the vehicle event to (2) a second amount of time after the vehicle event. The first amount of time and the second amount of time are determined based on the vehicle event. Vehicle diagnostic information is determined based on the portion of the second data.

In some embodiments, the method further comprises receiving a first input from a user of the vehicle, wherein the occurrence of the vehicle event is determined based on the first input.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
collecting first data associated with a vehicle at a first frequency;
collecting second data associated with the vehicle at a second frequency greater than the first frequency, wherein a size of the second data is greater than a size of the first data;
determining, by an electronic control unit (ECU) of the vehicle, whether a vehicle event associated with the vehicle is occurring, wherein the vehicle event relates to an operational state of one or more electrical control units onboard the vehicle;
based on a determination of an occurrence of the vehicle event, identifying, by the ECU, a relevant portion of the second data that corresponds to a time range associated with the vehicle event, wherein the relevant portion of the second data comprises a least amount of high fidelity log data to generate vehicle diagnostic information associated with the vehicle event, wherein:
the time range comprises a first amount of time prior to the vehicle event and a second amount of time after the vehicle event, and
the first amount of time and the second amount of time are determined based on the vehicle event;
providing at least a portion of the first data and the relevant portion of the second data for transmission to an electronic device to cause evaluation of the vehicle diagnostic information and generation of a repair plan associated with the vehicle event;
receiving, by the ECU of the vehicle, the repair plan from the electronic device; and
receiving service from a service vehicle that provides assistance to the vehicle relating to the vehicle event through a connection with the vehicle to execute at least in part the repair plan.

2. The method of claim 1, further comprising receiving a first input from a user of the vehicle, wherein the occurrence of the vehicle event is determined based on the first input.

3. The method of claim 1, further comprising:
receiving a second input from a user of the vehicle;
in response to receiving the second input, determining that the vehicle event is not occurring; and
in accordance with the determination that the vehicle event is not occurring, forgoing transmitting the portion of the second data.

4. The method of claim 1, further comprising based on the determination of the occurrence of the vehicle event, requesting an input from a user of the vehicle.

5. The method of claim 4, further comprising:
in response to a request for user input, receiving a third input from the user of the vehicle; and
transmitting the third input, wherein the vehicle diagnostic information is determined further based on the third input.

6. The method of claim 4, wherein the input is requested further in accordance with a determination the vehicle is parked.

7. The method of claim 4, wherein the input comprises a selection on a graphical user interface of the vehicle, a media file associated with the vehicle event, a voice input, or a combination thereof.

8. The method of claim 1, wherein the second data are collected from the one or more electrical control units.

9. The method of claim 1, wherein the portion of the second data comprises data collected from an electrical control unit associated with the vehicle event.

10. The method of claim 1, further comprising based on the determination of the occurrence of the vehicle event, transmitting at least a portion of the first data.

11. The method of claim 1, wherein the first amount of time and the second amount of time are determined based on a severity of the vehicle event.

12. The method of claim 1, further comprising:
in response to receiving the vehicle diagnostic information, requesting an input from a user of the vehicle;
in response to a request for user input, receiving a fourth input from the user of the vehicle; and
in response to receiving the fourth input, transmitting an instruction to address the vehicle event.

13. The method of claim 1, further comprising:
in response to receiving the vehicle diagnostic information, requesting an input from a user of the vehicle;
in response to a request for user input, receiving a fifth input from the user of the vehicle; and
in response to receiving the fifth input, transmitting an instruction to not address the vehicle event.

14. The method of claim 1, further comprising:
collecting third data from an output of a sensor of the vehicle; and
based on the determination of the occurrence of the vehicle event, transmitting a portion of the third data, wherein the vehicle diagnostic information is determined further based on the portion of the third data.

15. The method of claim 1, further comprising based on the determination of the occurrence of the vehicle event, transmitting an instruction to assist with the vehicle event.

16. The method of claim 1, further comprising:
determining whether vehicle data after the vehicle event is of greater interest for diagnosing the vehicle event, wherein:
the first amount of time is greater than the second amount of time based on a determination that the vehicle data after the vehicle event is not of greater interest for diagnosing the vehicle event, and
the second amount of time is greater than the first amount of time based on a determination that the vehicle data after the vehicle event is of greater interest for diagnosing the vehicle event.

17. A system comprising:
a vehicle comprising one or more electrical control units;
a server; and
one or more processors configured to cause the system to perform a method comprising:
collecting first data associated with the vehicle at a first frequency;
collecting second data associated with the vehicle at a second frequency greater than the first frequency, wherein a size of the second data is greater than a size of the first data;
determining whether a vehicle event associated with the vehicle is occurring, wherein the vehicle event relates to an operational state of the one or more electrical control units;
based on a determination of an occurrence of the vehicle event, identifying a relevant portion of the second data that corresponds to a time range associated with the vehicle event, wherein the relevant portion of the second data comprises a least amount of high fidelity log data to generate vehicle diagnostic information associated with the vehicle event, wherein:
the time range comprises a first amount of time prior to the vehicle event and a second amount of time after the vehicle event, and
the first amount of time and the second amount of time are determined based on the vehicle event;
providing at least a portion of the first data and the relevant portion of the second data for transmission to the server to cause evaluation of the vehicle diagnostic information and generation of a repair plan associated with the vehicle event;
receiving the repair plan from the server; and
receiving service from a service vehicle that provides assistance to the vehicle relating to the vehicle event through a connection with the vehicle to execute at least in part the repair plan.

18. The system of claim 17, wherein the method further comprises receiving a first input from a user of the vehicle, wherein the occurrence of the vehicle event is determined based on the first input.

19. The system of claim 17, wherein the second data are collected from the one or more electrical control units.

20. A non-transitory computer readable storage medium storing one or more programs, the one or more programs comprising instructions, which when executed by a system with one or more processors and memory, cause the system to perform a method comprising:
collecting first data associated with a vehicle at a first frequency;
collecting second data associated with the vehicle at a second frequency greater than the first frequency, wherein a size of the second data is greater than a size of the first data;
determining whether a vehicle event associated with the vehicle is occurring, wherein the vehicle event relates to an operational state of one or more electrical control units of the vehicle;
based on a determination of an occurrence of the vehicle event, identifying a relevant portion of the second data that corresponds to a time range associated with the vehicle event, wherein the relevant portion of the second data comprises a least amount of high fidelity log data to generate vehicle diagnostic information associated with the vehicle event, wherein:
the time range comprises a first amount of time prior to the vehicle event and a second amount of time after the vehicle event, and
the first amount of time and the second amount of time are determined based on the vehicle event;
providing at least a portion of the first data and the relevant portion of the second data for transmission to an electronic device to cause evaluation of the vehicle diagnostic information and generation of a repair plan associated with the vehicle event;
receiving the repair plan from the electronic device; and
receiving service from a service vehicle that provides assistance to the vehicle relating to the vehicle event through a connection with the vehicle to execute at least in part the repair plan.

21. The non-transitory computer readable storage medium of claim 20, wherein the method further comprises receiving a first input from a user of the vehicle, wherein the occurrence of the vehicle event is determined based on the first input.

* * * * *